(12) United States Patent
Sapire

(10) Patent No.: US 10,016,085 B2
(45) Date of Patent: Jul. 10, 2018

(54) PRESSURE COOKER

(71) Applicant: HOMELAND HOUSEWARES, LLC, Los Angeles, CA (US)

(72) Inventor: Colin Sapire, Los Angeles, CA (US)

(73) Assignee: Capbran Holdings, LLC, Los Angeles, CA (US)

( * ) Notice: Subject to any disclaimer, the term of this patent is extended or adjusted under 35 U.S.C. 154(b) by 67 days.

(21) Appl. No.: 14/723,100

(22) Filed: May 27, 2015

(65) Prior Publication Data

US 2016/0345766 A1  Dec. 1, 2016

(51) Int. Cl.
*A47J 37/12* (2006.01)
*A47J 27/08* (2006.01)

(52) U.S. Cl.
CPC ....... *A47J 27/0804* (2013.01); *A47J 27/0815* (2013.01)

(58) Field of Classification Search
CPC .... A47J 27/08; A47J 27/0804; A47J 27/0811; A47J 27/0813; A47J 27/0815; A47J 36/06; A47J 36/10
USPC .......................................................... 99/403
See application file for complete search history.

(56) References Cited

U.S. PATENT DOCUMENTS

| | | | |
|---|---|---|---|
| 4,511,118 A * | 4/1985 | Kuhl | A62B 9/02 251/129.1 |
| 5,768,976 A | 6/1998 | Suk | |
| 5,839,357 A | 11/1998 | Ha | |
| 6,019,029 A | 2/2000 | Chan | |
| 6,067,896 A | 5/2000 | Elorza | |
| 6,173,643 B1 | 1/2001 | Qian et al. | |
| 6,257,124 B1 | 7/2001 | Chen | |
| 6,283,015 B1 * | 9/2001 | Kwon | A47J 27/09 219/435 |
| 6,523,459 B1 * | 2/2003 | Chameroy | A47J 27/09 220/316 |

(Continued)

FOREIGN PATENT DOCUMENTS

| | | |
|---|---|---|
| CN | 1165256 | 9/2004 |
| CN | 1165256 C | 9/2004 |

(Continued)

OTHER PUBLICATIONS

Written Opinion of the International Search Authority for PCT/IB2016/052989, which claims priority to and is the equivilent of the present application.

*Primary Examiner* — Dana Ross
*Assistant Examiner* — Brandon Harvey
(74) *Attorney, Agent, or Firm* — Trojan Law Offices

(57) ABSTRACT

A pressure cooker comprises a handle, a body, an outer lid being pivotally mounted on the body, an inner vessel with flange extending radially, an inner lid that is configured to cover the inner vessel, a rotatable rim protrusions that selectively engages with the flange of the inner vessel. The pressure cooker that utilizes an one-hand opening and locking mechanism that simultaneously locks the outer lid with the main body and locks the inner lid with the inner vessel. The locking of the outer lid is achieved by a clasp assembly, whose position is controlled by the handle. The locking of the outer lid is achieved by the pairing of the flange and the rim protrusions, whose position is also controlled by the handle. The pressure cooker also comprises a pressure rod that changes its level based on the pressure of the inner vessel.

12 Claims, 17 Drawing Sheets

(56) References Cited

U.S. PATENT DOCUMENTS

| | | | |
|---|---|---|---|
| 7,373,874 | B2 | 5/2008 | Seurat Guiochet et al. |
| 7,669,521 | B2 | 3/2010 | Cartigny et al. |
| 7,718,928 | B2 | 5/2010 | He et al. |
| 8,546,731 | B2 | 10/2013 | Pellerin et al. |
| 8,695,631 | B2 | 4/2014 | Hasegawa |
| 2009/0095166 | A1 | 4/2009 | Jian |
| 2011/0147365 | A1* | 6/2011 | Pellerin ................ A47J 27/004 219/440 |
| 2012/0255951 | A1 | 10/2012 | Grozinger |
| 2013/0249698 | A1* | 9/2013 | Fissler ................ A47J 27/0802 340/626 |

FOREIGN PATENT DOCUMENTS

| | | |
|---|---|---|
| CN | 100569153 C | 12/2009 |
| CN | 203555560 | 4/2014 |
| KR | 01375941 Y1 | 2/1999 |
| WO | WO2006/061339 | 6/2006 |
| WO | WO2008/011768 | 1/2008 |
| WO | WO2011/128577 | 10/2011 |

\* cited by examiner

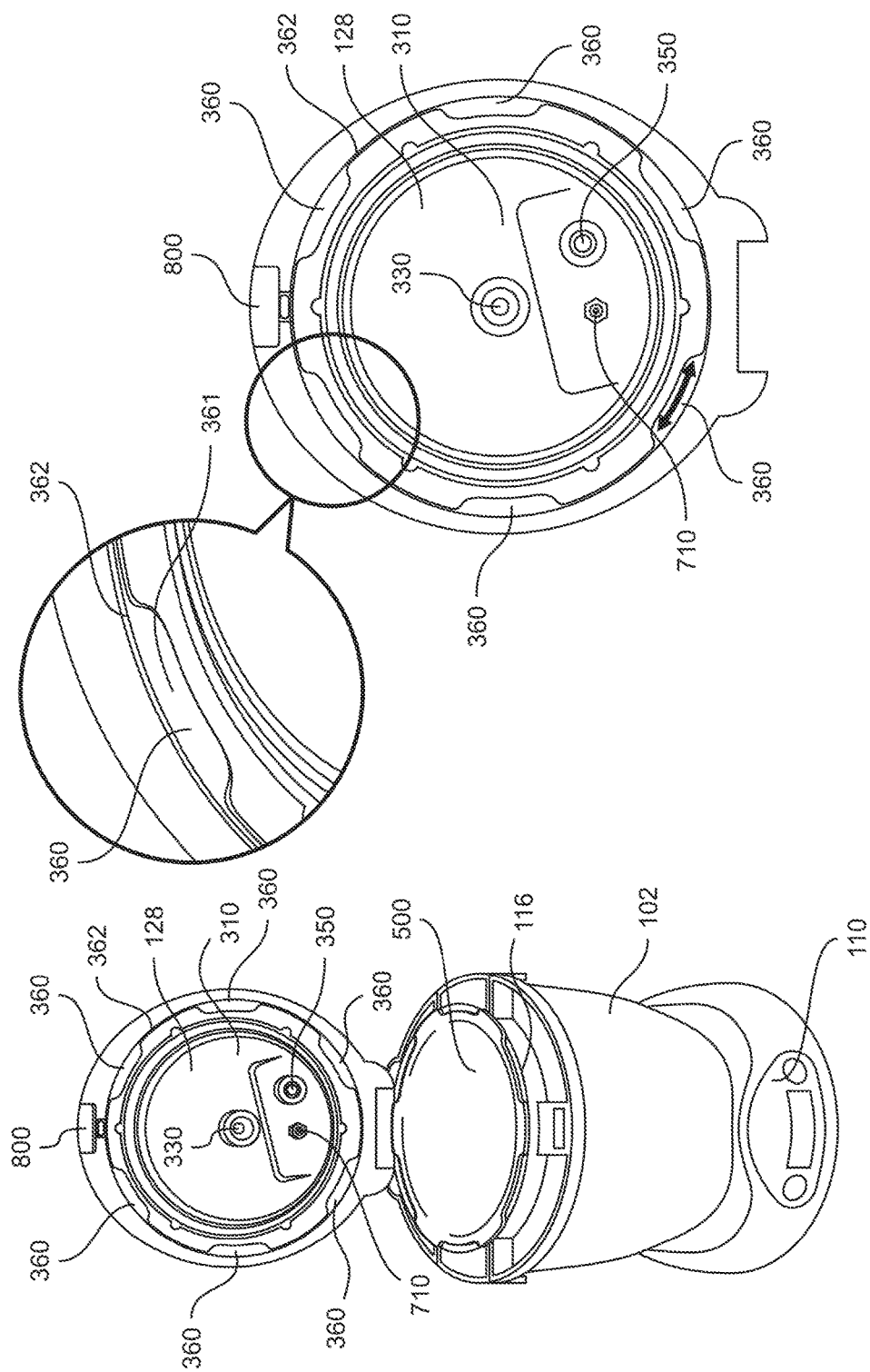

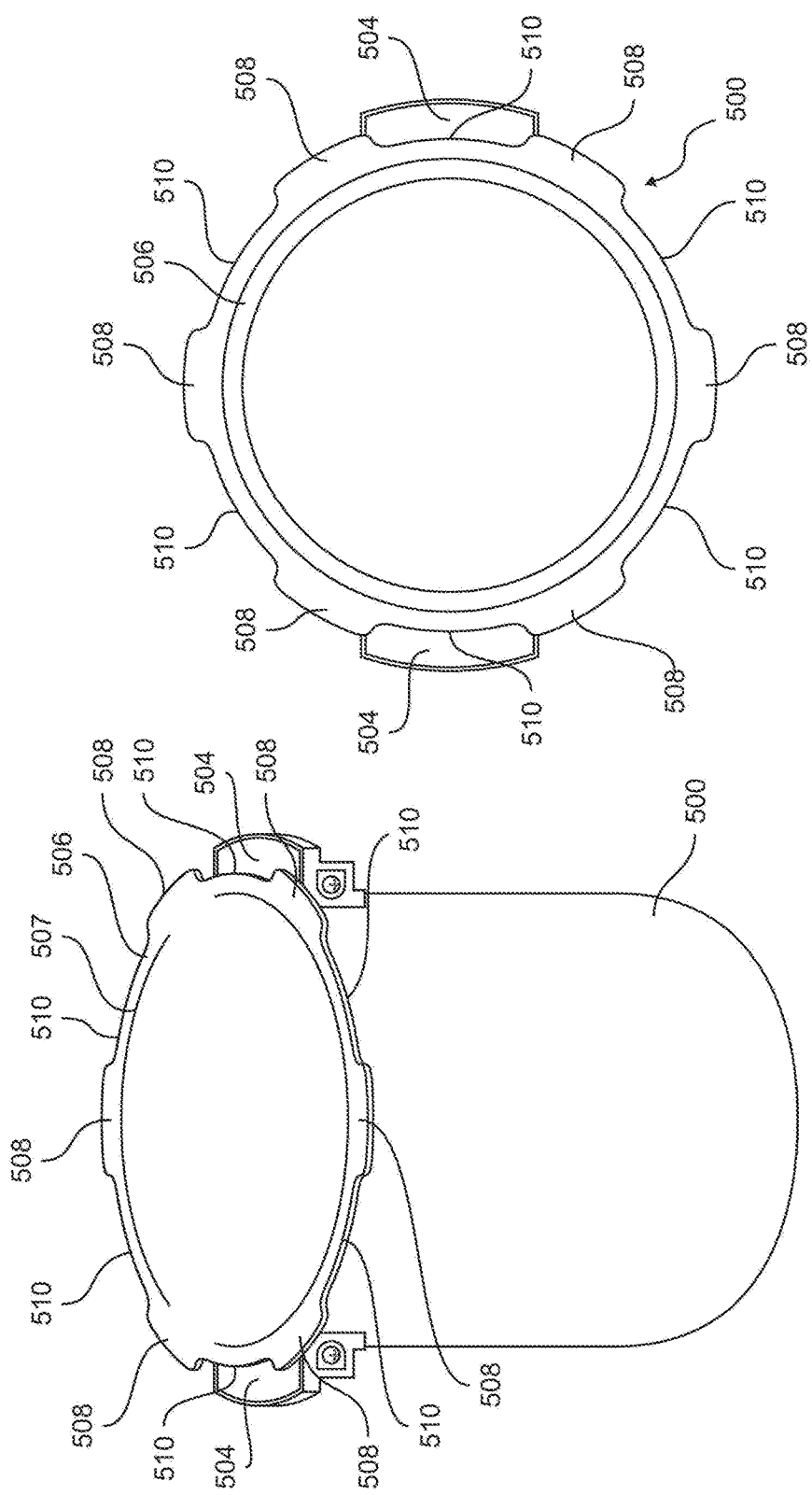

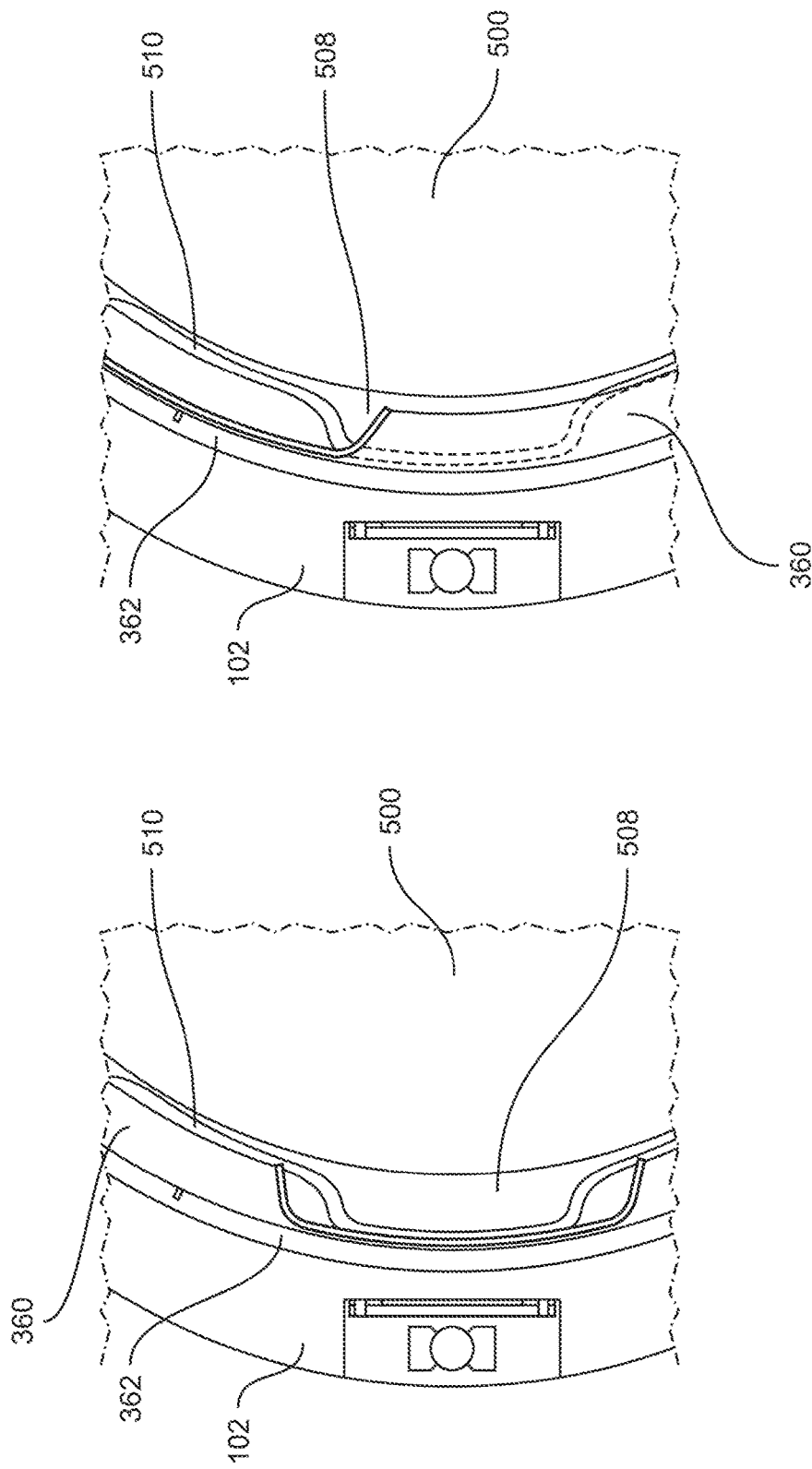

PRESSURE COOKER

FIELD OF THE INVENTION

The present invention relates to household and kitchen appliances. In particular, the present invention relates to cooking devices. Even more particularly, the present invention relates to pressure-cooking devices with various safety features.

BACKGROUND

Pressure cooking refers to a method of cooking that utilizes the heating of an enclosed and sealed cooking chamber. The pressure built up in the sealed chamber reduces the cooking time and changes the texture of the food. This type of cooking is desirable in many situations because it often saves time and energy.

However, pressure cookers also have their drawbacks. The main concern raised by pressure cooking is related to safety. One major safety concern is that users may be injured by the hot and pressurized steam if the users open the lid of the pressure cooker when the pressure is high. The hot and pressurized gas may be vigorously ejected from the cooker when the lid is opened.

Another safety concern is that the lids of pressure cookers may not be secured tightly enough. When pressure builds up inside such cookers, some lid designs may not withstand the high pressure. This again can cause severe injury to users if the lid is blown off when the internal pressure exceeds the tolerance of the lid. In some extreme cases, the pressure cooker itself could may explode. Another draw back is that some lids are not designs to carry the weight of the pressure cooker. Such lid designs may be compromised over time when used repeatedly to transport the pressure cooker. Hence, when a user carries the cooker with only one hand by the holding the handle of the lid, the lid seal may be compromised, resulting in faulty performance.

As such, providing a convenient yet safe way to open and lock the lid of a pressure cooker that addresses different safety concerns is always a challenge in designing pressure cookers. A lid that can be opened with one hand is often used in regular rice cookers but is rare in pressure cookers. While such a lid is convenient for users to open the lid, it normally only relies on one locking mechanism that is usually not strong enough to withstand the pressure in a pressure cookers. Pressure cookers usually utilizes a two-hand locking method that requires users to first screw in the lid to the body of the pressure cooker by turning the lid several rounds, then lock the lid and body with an additional locking mechanism. This design, despite normally being capable of withstanding the pressure, is very inconvenient to use.

SUMMARY

It is an objective of the present invention to provide a pressure cooker that is convenient and safe to use. It is also an objective of the present invention to provide a design that permits users to open a pressure cooker with only one hand while not compromising the integrity of pressure cooker to withstand high pressure. It is a further object of the present invention to incorporate into a pressure cooker various new and novel combinations of safety and convenience features.

In one embodiment of the present invention, a pressure cooker comprises a main body with a chamber therein; an outer lid that is pivotally mounted on the main body such that the outer lid can be opened or closed relative to the main body; a handle; and an inner vessel that is configured to be removably placed within the chamber. The inner vessel has a circumference with a flange extending radially from the circumference. The flange may also have sections that are recessed so that the flange varies in width about its circumference. On the bottom surface of the outer lid, an inner lid is mounted and secured. A rim surrounding the inner lid is also mounted on the outer lid but is rotatable in relationship to the inner lid. The inner lid is configured to cover the inner vessel when the outer lid is closed. There are rim protrusions that form a groove or slot under the rim. The slots are formed by the rim protrusions because the protrusions extend outward from the rim a distance greater than flange of the inner vessel before extending down and inward under the rim. The radius of the rim is larger than the radius of the inner vessel. The rim protrusions are configured to fit into the recessed portions of the flange of the inner vessel so that when the rim is rotated, the flange of the inner vessel slides into the slot formed by each rim protrusion to snuggly secure the inner lid to the inner vessel.

In one embodiment of the present invention, the pressure cooker has an actuator mechanism comprising a rod, a handle, a locking arm, a safety arm, and a support plate. The outer lid has an interior chamber that houses the actuator mechanism. The support plate is located within the interior chamber. In the preferred embodiment, the rod is rotatably secured in the center of the support plate and extends upward to pass through an aperture in the top of the outer lid. The handle is secured to the top of the rod, which makes the handle accessible to the user above the outer lid. The locking arm and the safety arm are secured to the rod within the interior chamber. In the preferred embodiment, three arcuate slits are formed in the support plate at an approximately equal distance from each other. A primary attachment means is secured to the locking arm at a position on the locking arm that permits the primary attachment means to pass through one of the arcuate slits to be secured to the top of the rim, which is located below the support plate. This configuration permits the user to rotate the handle in order to rotate the rim via the locking arm thereby locking the inner lid in place through the engagement of the rim protrusions with the flange of the inner vessel described above.

The other two arcuate slits in the support plate also have secondary attachment means passing through them and are secured to the top of the rim, but these secondary attachment means are not attached to any locking arm. The two secondary attachment means slide freely in the other two slits, but include a feature, such as a bolt head or washer or analogous device, that permits the secondary attachment means to be biased against the top of the support plate to assist with stable rotation of the rim as the locking arm moves the rim into a locked position.

The safety arm of the actuator mechanism is positioned above a safety channel in the support plate. The safety arm has a member that descends into the safety channel wherein the member can freely move within the length of the safety channel if the internal pressure is at a level that is safe for the cooker to be opened. The safety channel is positioned above a pressure rod that is incorporated into the top of the inner lid. When the pressure in the inner vessel rises to a level that would make it unsafe to open, then the pressure rod extends into the safety channel thereby blocking the safety arm member from moving. Since the safety arm is secured to the rod, this means that the rod cannot rotate, which effectively prevents the locking arm from moving to the unlocked position because the locking arm can only move in response to rotation of the rod. This mechanism prevents the user from opening the pressure cooker when the pressure inside renders it is unsafe to open.

The outer lid also has a clasp assembly that includes a spring assembly mechanism that biases the clasp assembly in the locked position. The clasp assembly is configured to interact with the locking arm when the actuator mechanism moves to the open position such that the locking arm applies a force to the clasp assembly to overcome the force of the spring assembly that keeps the outer lid in a locked position. When the clasp assembly is in an unlocked position, then the outer lid may be opened.

The actuator mechanism has at least a first open position and a second closed position. At the first open position, the handle via the rod and locking arm causes the rim to turn so that the rim protrusions align with the recesses of the flange of the inner vessel, thus allowing the inner vessel to be detached from the inner lid, and the locking arm further causes the clasp assembly to be biased in an unlocked position. At the second closed position, the handle via the rod and locking arm causes the rim to rotate in the opposite direction so that the flange of the inner vessel slides into the groove of the rim protrusions, thus locking the inner lid on top of the inner vessel. When the locking arm rotates the rim into the locked position, the locking arm simultaneously disengages from the spring assembly, which causes the clasp assembly to return to a locked position in which the outer lid is also locked in place. In another embodiment, the inner lid is traversed by a pressure rod. The pressure rod is configured so that it is pushed upward by pressure within the inner vessel during cooking The pressure rod provides an indication of the level of pressure in the inner vessel.

In yet another embodiment, the pressure cooker further comprises an electromagnetic valve. The inner lid has an air-releasing assembly mounted on its upper surface. An air-releasing conduit is present within the air-releasing assembly. The air-releasing conduit traverses the inner lid such that air can go in or out of the inner vessel through the air-releasing conduit. A ball bearing is movably mounted within the air-releasing assembly. The ball bearing has a sealed position and a released position. The air-releasing conduit cannot release pressure from the inner vessel when the ball bearing is at the sealed position, and can release pressure when the ball bearing is at the released position. The electromagnetic valve controls the position of the ball bearing such that the electromagnetic valve can control the pressure of the inner vessel.

BRIEF DESCRIPTION OF THE DRAWINGS

FIG. 3 is a perspective view of a pressure cooker in accordance with an embodiment of the present invention when the outer lid is opened.

FIG. 4 is an enlarged view of the lower surface of the outer lid of a pressure cooker in accordance with an embodiment of the present invention.

FIG. 5 is a perspective view of an inner vessel of a pressure cooker in accordance with an embodiment of the present invention.

FIG. 6 is a top view of the inner vessel shown in FIG. 5.

FIG. 16 is an enlarged view of the flanges of an inner vessel of a pressure cooker in accordance with an embodiment of the present invention with emphasis on the interaction between the flanges and the rim protrusions.

FIG. 17 another enlarged view of the flanges of an inner vessel of a pressure cooker in accordance with an embodiment of the present invention with the flanges and the rim protrusions changed in position.

DETAILED DESCRIPTION OF EMBODIMENTS

The following description is made for the purpose of illustrating the general principles of the invention and should not be taken in a limiting sense. The scope of the invention is best determined by reference to the appended claims.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

Figure 2:
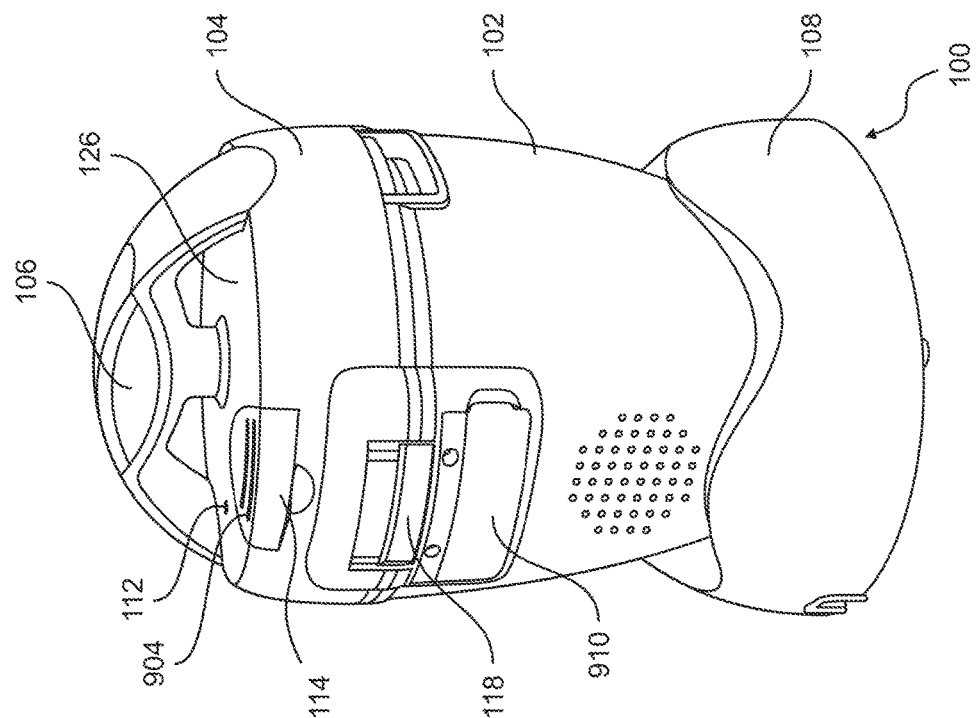
FIG. 2 is a rear perspective view of a pressure cooker in accordance with an embodiment of the present invention.
Figure 1:
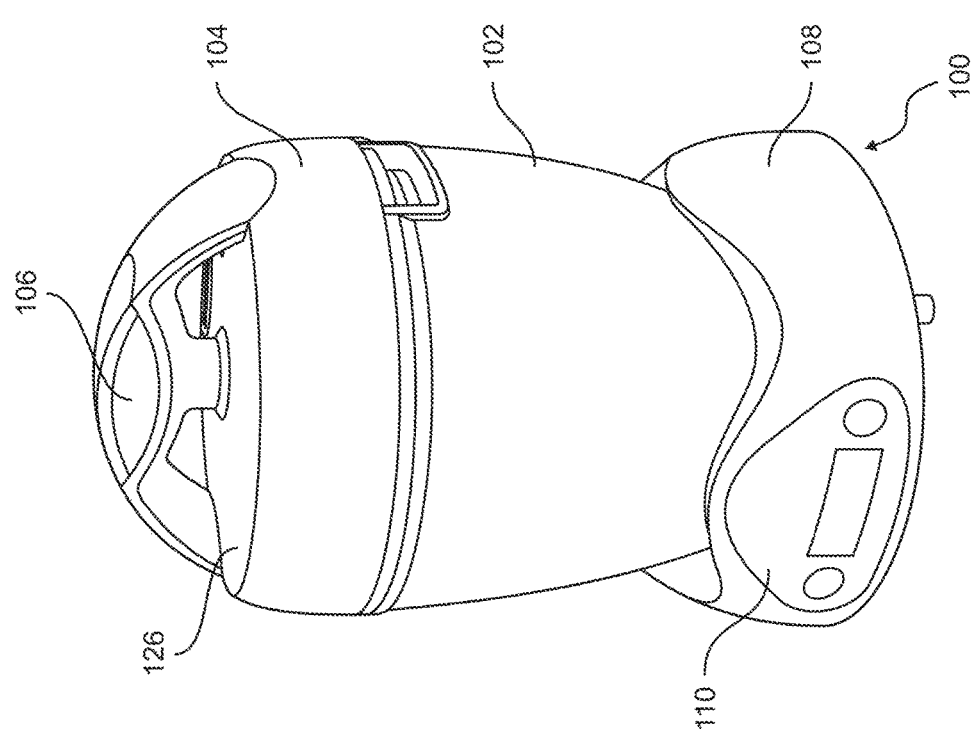
FIG. 1 is a front perspective view of a pressure cooker in accordance with an embodiment of the present invention.
Figure 29:
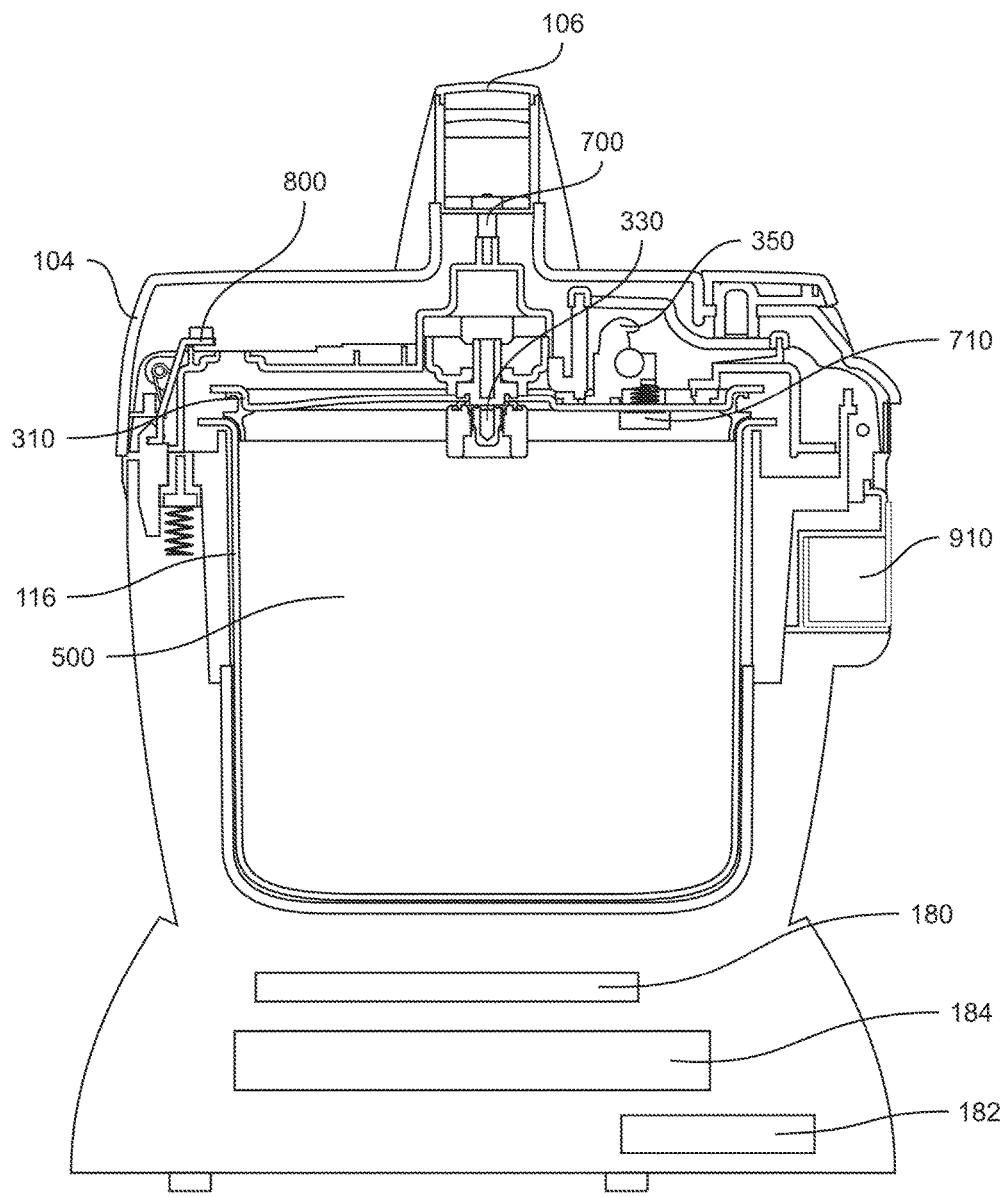
FIG. 29 is a side internal view of a pressure cooker in accordance with an embodiment of the present invention.

Now referring to FIGS. 1 and 2, FIG. 1 shows a front perspective view of an embodiment of the present invention 100. FIG. 2 is the corresponding rear perspective view of the same embodiment. The pressure cooker 100 comprises a main body 102, an outer lid 104, a handle 106, a base 108, and a user interface 110. The main body 102 has a chamber 116 inside the main body 102. The outer lid 104 covers the chamber 116 so the chamber 116 is not visible in FIG. 1. The chamber 116 is best shown in FIG. 29. The user interface 110 has buttons and display thereon for the users to control the pressure cooker 100. A pressure indicator 112 and a steam valve 114 are present on the upper surface 126 of the outer lid 104.

The outer lid 104 is pivotally mounted on the main body 102 by the joint 118 in the back of the pressure cooker 100. As such, the outer lid 104 can be pivotally opened or closed relative to the main body 102. FIG. 1 is a view when the outer lid 104 is closed and FIG. 3 is a view when the outer lid 104 is open. At the top of the outer lid 104, the handle 106 is rotatably mounted. The handle 106 comprises a rotary switch knob so that the users can turn the handle 106 clockwise or counter-clockwise to open or close the outer lid 104 in relation to the main body 102. The mechanism of turning the handle 106 to open or close the outer lid 104 is discussed in further detail below.

FIG. 3 is a perspective view of the pressure cooker 100 when the outer lid 104 is open with an inner vessel 500 visible inside the pressure cooker 100. The inner vessel 500 can be removably placed within the chamber 116 of the main body 102. The inner vessel 500 is a container in which food is placed for cooking The inner vessel 500 can be taken out from the main body 102 to be cleaned.

FIGS. 5 and 6 show isolated views of the inner vessel 500 in accordance with a particular embodiment of the present invention. In this embodiment, the inner vessel 500 is a cylinder receptacle with open top. On the outer wall of the inner vessel 500, there are two handles 504. The handles 504 serve at least two different purposes. First, the handles 504 can act as handgrips for the users to hold the inner vessel 500 when the inner vessel 500 is taken out of the pressure cooker 100. Second, referring back to FIG. 3, the handles 504 align the inner vessel 500 with the chamber 116 such that, when the inner vessel 500 is placed into the chamber 116, only certain orientations are allowed to prevent the inner vessel 500 from rotating inside the chamber 116. While in the embodiment shown, there are two handles 504, those skilled in the art will understand that there could be one or any numbers of handles 504 to restrict the rotation of the inner vessel 500 inside the chamber 116.

Still referring to FIGS. 5 and 6, the inner vessel 500 has a top edge 506 with a circumference 507 with a flange 508 extending radially from the top edge 506 and one or more recesses 510. The recesses 510 are formed in the flange 508. The flange 508 may extend radially outward from the circumference 506, as shown in this particular embodiment, or radially inward in some other embodiments. The flange 508 and recesses 510 are structural elements of the inner vessel 500 that allow the inner vessel 500 to be locked inside the pressure cooker 100 by a mechanism to be discussed in further detail below.

Figure 23:
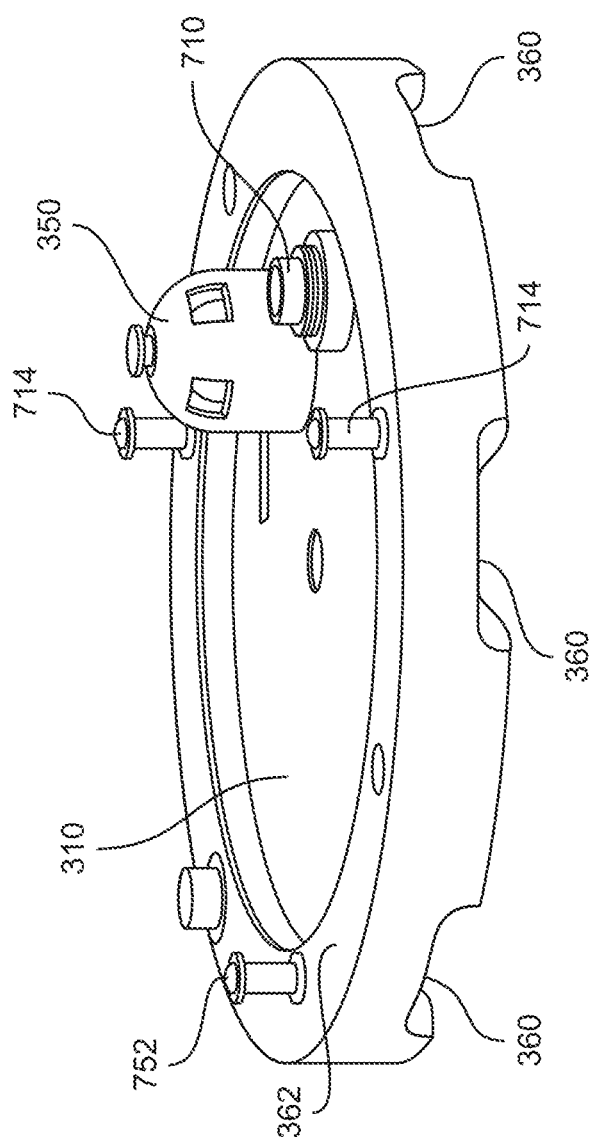
FIG. 23 is an isolated view of an inner lid and a rim of a pressure cooker in accordance with an embodiment of the present invention.

FIG. 4 is an enlarged view of the bottom surface 128 of the outer lid 104. An inner lid 310 is secured to the bottom surface 128. The inner lid 310 is the lid that covers the inner vessel 500 when the outer lid 104 is closed. The inner lid 310 has an upper surface 312, which are best shown in FIG. 23, which is an isolated view of the inner lid 310. Several safety and sensing elements are mounted on the inner lid 310. These elements include a temperature measuring assembly 330, a pressure rod 710, and an air-releasing assembly 350, whose structures will be discussed in further detail below.

Still referring to FIG. 4, a rim 362 is rotatably mounted on the bottom surface 128 of the outer lid 104. The rim 362 surrounds the inner lid 310 and is rotatable in relationship to the inner lid 310. One or more rim protrusions 360 are present at the 362. The rim 362 and rim protrusions 360 are rotatable clockwise and counter-clockwise. The rim protrusions 360 form a groove or slot under the rim 362. The slots are formed by the rim protrusions 360 because the protrusions 360 extend outward from the rim 362 a distance greater than flange 508 of the inner vessel 500 before extending down and inward under the rim 310. The rim protrusions 360 are configured to fit into the recessed portions 510 of the flange 508 of the inner vessel 500 so that when the rim 362 is rotated, the flange 508 of the inner vessel 500 slides into the slot formed by each rim protrusion 360 to snuggly secure the inner lid 310 to the inner vessel 500.

Figures 7, 8:
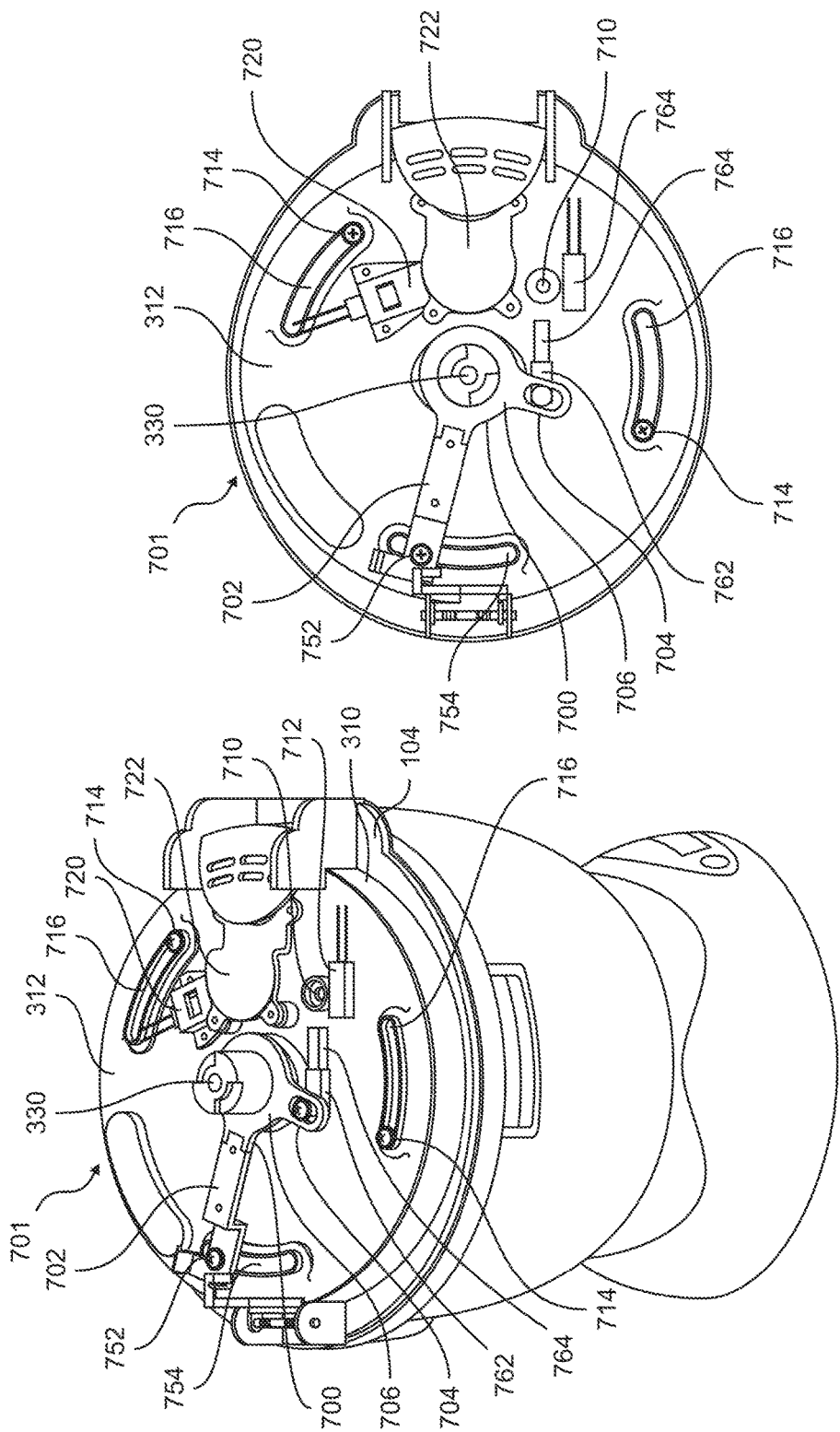
FIG. 7 is an internal view of the interior of an outer lid of a pressure cooker in accordance with an embodiment of the present invention.
FIG. 8 is the top internal view of the interior of the outer lid shown in FIG. 7.
Figure 9:
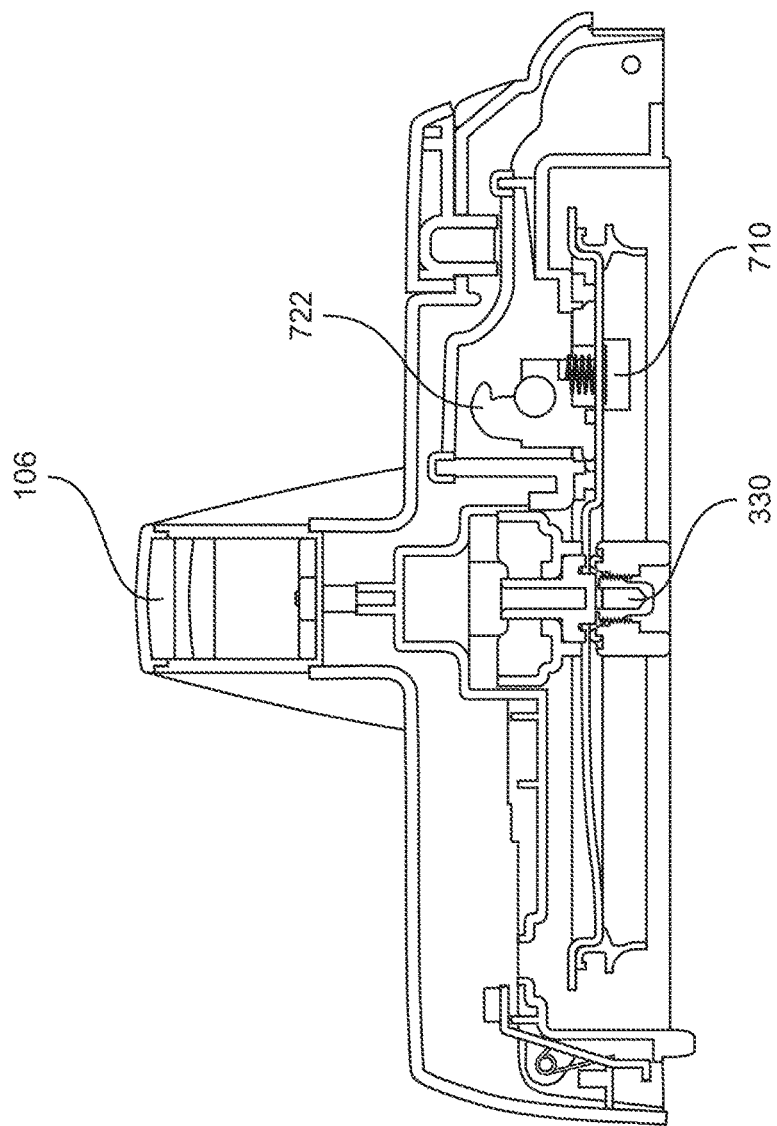
FIG. 9 is a side internal view of the interior of an outer lid of a pressure cooker in accordance with an embodiment of the present invention.

Referring to FIGS. 7, 8, and 9, FIG. 7 is an internal view of the interior chamber 701 of the outer lid 104 in accordance with an embodiment of the present invention. FIG. 7 shows the upper surface of the inner lid 310 and different features and mechanisms of the pressure cooker 100. FIG. 8 is a top internal view of the outer lid 104 and FIG. 9 is a side internal view of the outer lid 104.

FIGS. 7, 8, 9, 14 and 15 show an actuator mechanism comprising an actuator rod 700, a handle 106, a locking arm 702, a safety arm 704, and a support plate 312. The outer lid 104 has an interior chamber 701 that houses the actuator mechanism. The support plate 312 is located within the interior chamber 701. In the preferred embodiment, the actuator rod 700 is rotatably secured in the center of the support plate 312 and extends upward to pass through an aperture 760 (shown in FIG. 9) in the top of the outer lid 104. The handle 106 is secured to the top of the actuator rod 700, which makes the handle 104 accessible to the user above the outer lid 104. The locking arm 702 and the safety arm 704 are secured to the actuator rod 700 within the interior chamber 701. In the preferred embodiment, three arcuate slits 716 and 754 are formed in the support plate 312 at an approximately equal distance from each other. A primary attachment means 752 is secured to the locking arm 702 at a position on the locking arm 702 that permits the primary attachment means 752 to pass through arcuate slit 754 to be secured to the top of the rim 362, which is located below the support plate 312. This configuration permits the user to rotate the handle 106 in order to rotate the rim 362 via the locking arm thereby locking the inner lid 310 in place through the engagement of the inner rim protrusions 360 with the flange 508 of the inner vessel 500 described above.

Focusing on FIGS. 7 and 8, the other two arcuate slits 716 in the support plate 312 also have secondary attachment means 714 passing through them and are secured to the top of the rim 362, but these secondary attachment 714 means are normally not attached to any locking arm. The two secondary attachment means 714 slide freely in the other two slits 716, but include a feature, such as a bolt head or washer or analogous device, that permits the secondary attachment means to be biased against the top of the support plate 312 to assist with stable rotation of the rim 362 as the locking arm 702 moves the rim 362 into a locked position. The primary attachment means 752 and secondary attachment means 714 can be any conventional attachment means such as screws, bolts, or any other means for securing two elements together.

The safety arm 704 of the actuator mechanism is positioned above a safety channel 764 in the support plate 312. The safety channel 764 is positioned above a pressure rod 710 that is incorporated into the top of the inner lid 310. The safety arm 704 has a member 762 that descends below the safety channel 764 wherein the member 762 can freely move within the length of the safety channel 764 if the internal pressure is at a level that is safe for the cooker to be opened. When the pressure in the inner vessel 500 rises to a level that would make it unsafe to open, then the pressure rod 710 extends into the safety channel 764 thereby blocking the safety arm member 762 from moving. Since the safety arm 704 is secured to the actuator rod 700, this means that the actuator rod 700 cannot rotate, which effectively prevents the locking arm 702 from moving to the unlocked position because the locking arm 702 can only move in response to rotation of the actuator rod 700. This mechanism prevents the user from opening the pressure cooker when the pressure inside renders it is unsafe to open.

Still referring to FIGS. 7, 8, and 9, in the interior chamber 701 of the outer lid 104, there are also a temperature measuring assembly 330, a pressure rod 710, a reed switch 712 located near the pressure rod 710, an electromagnetic valve assembly 720, and an air-releasing assembly 722. The structure of these elements and the interaction of these elements with other components of the pressure cooker 100 will be discussed in further detail below.

FIGS. 10-16 illustrates a locking mechanism that simultaneously locks the outer lid 104 with the main body 102 and locks the inner lid 310 with the inner vessel 500. As discussed above, the handle 106, the actuator rod 700, and the rim 362 are connected together. They are all configured to have at least respectively a first opened position and a second closed position. When users turn the handle 106 from the first opened position to the second closed position, the connection among the components of the locking mechanism will cause the rim 362 to move to the second closed position, and vice versa. FIGS. 10, 12, 14, 16 show that the handle 106, the actuator rod 700, and rim 362 are in their respective first opened positions. FIGS. 11, 13, 15, 17 show that the handle 106, the actuator rod 700, and the rim 362 are in their respective second closed positions. One of the advantages over many prior art pressure cookers is that the present invention can be easily opened and closed with one hand.

Referring specifically to FIGS. 10-13, the outer lid 104 has a clasp assembly 800 that includes a spring assembly mechanism 802 that biases the clasp assembly 800 in the locked position. The clasp assembly 800 is configured to interact with the locking arm 702 when the actuator mechanism moves to the open position such that the locking arm 702 applies a force to the clasp assembly 800 to overcome the force of a spring assembly 802 that keeps the outer lid 104 in a locked position. When the clasp assembly 800 is in an unlocked position, then the outer lid 104 may be opened.

At the first open position, the handle 106 via the actuator rod 700 and locking arm 702 causes the rim 362 to turn so that the rim protrusions 360 align with the recesses 510 of the flange 508 of the inner vessel 500, thus allowing the inner vessel 500 to be detached from the inner lid 310. The locking arm 702 further causes a clasp assembly 800 to be biased in an unlocked position. At the second closed position, the handle 106 via the actuator rod 700 and locking arm 702 causes the rim 362 to rotate in the opposite direction so that the flange 508 of the inner vessel 500 slides into the groove of the rim protrusions 360, thus locking the inner lid 310 on top of the inner vessel 500. When the locking arm 702 rotates the rim 362 into the locked position, the locking arm 702 simultaneously disengages the spring assembly 802, which causes the clasp assembly 800 to return to a locked position in which the outer lid 104 is also locked in place. Hence, both the inner lid 310 and outer lid 104 are locked at substantially the same time by a single action of the user.

Figure 10:
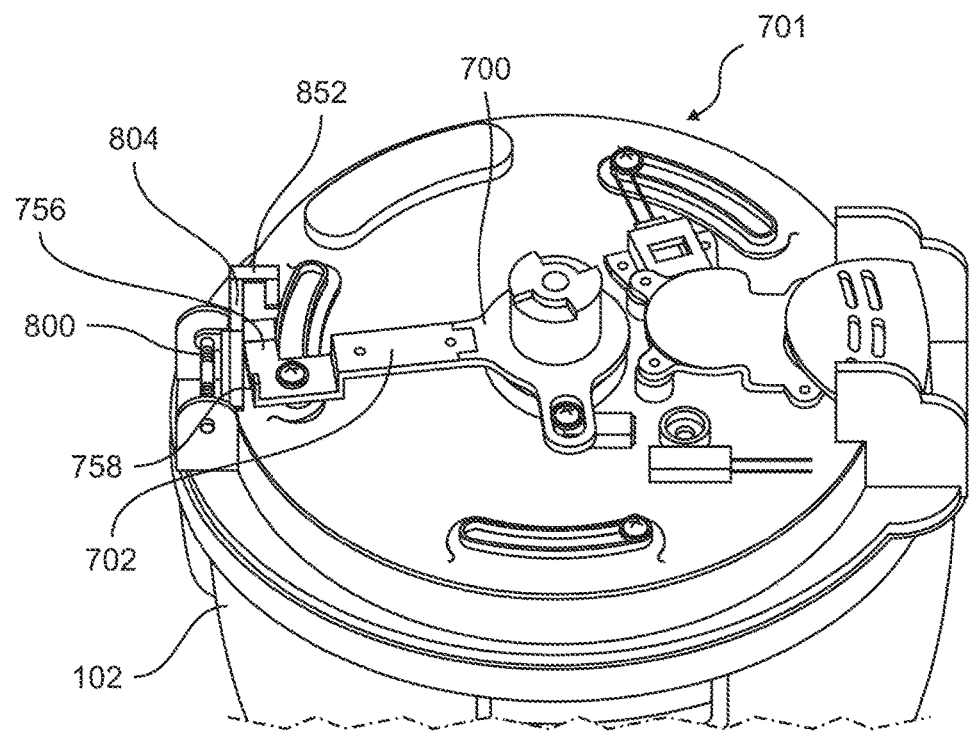
FIG. 10 is an enlarged view of a certain section of the interior of the outer lid of a pressure cooker in accordance with an embodiment of the present invention with emphasis on the interaction between a actuator rod and a clasp assembly.
Figure 11:
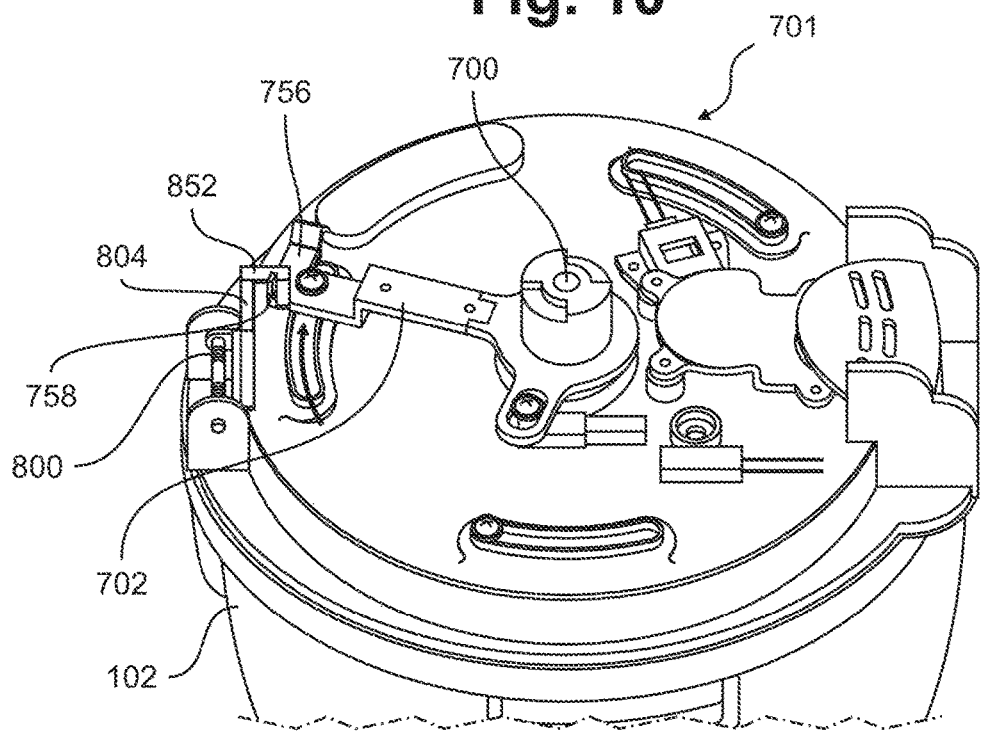
FIG. 11 is another enlarged view of a certain section of the interior of the outer lid of a pressure cooker in accordance with an embodiment of the present invention with the actuator rod and the clasp assembly in FIG. 10 changed in position.
Figure 13:
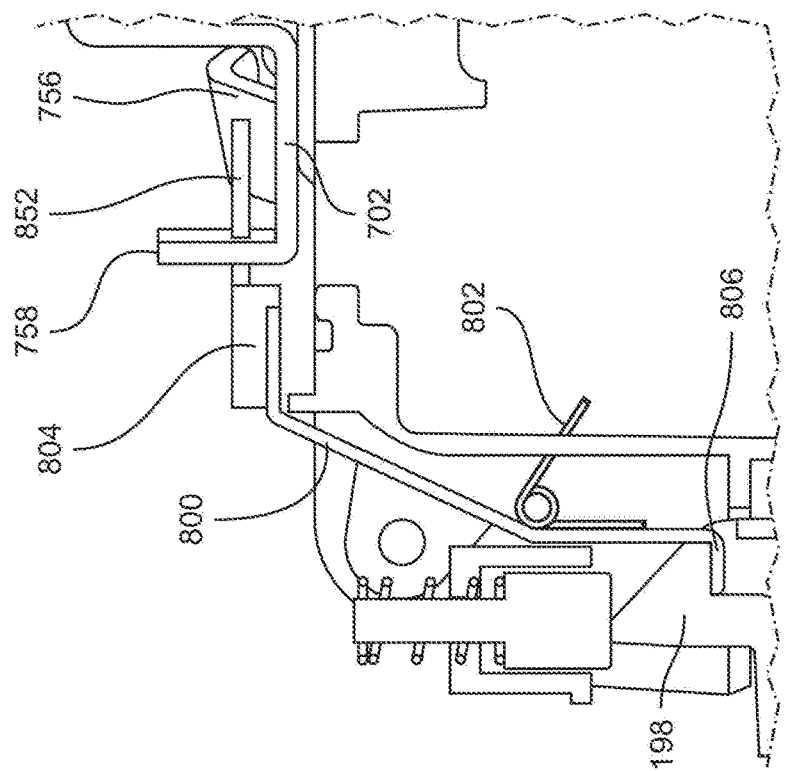
FIG. 13 is another side internal view of a certain section of the interior of the outer lid of a pressure cooker in accordance with an embodiment of the present invention with the actuator rod and the clasp assembly in FIG. 12 changed in position.
Figure 12:
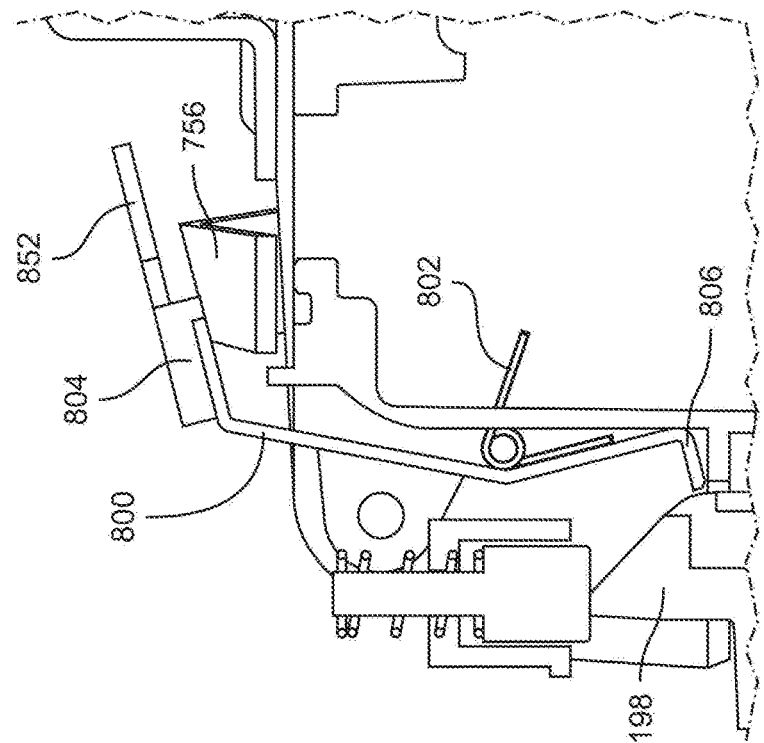
FIG. 12 is an enlarged side internal view of a certain section of the interior of the outer lid of a pressure cooker a pressure cooker in accordance with an embodiment of the present invention with emphasis on the interaction between a actuator rod and a clasp assembly.

The clasp assembly 800 is movably mounted in the outer lid 104. The clasp assembly 800 is rotatable vertically along a horizontal axis in a limited degree. FIGS. 12 and 13 show that the clasp assembly 800 is rotated to different possible positions. The clasp assembly 800 rests against the spring assembly 802 that pushes the clasp assembly 800 in one direction, such as in the clockwise direction in the particular embodiment shown in FIG. 13. The clasp assembly 800 generally has a first end 804 and a second end 806. The first end 804 has a hook 852 that is best shown in FIGS. 10 and 11. The hook 852 is configured to engage with the locking arm 702 based on the position of the locking arm 702. In the preferred embodiment the second end 806 of the clasp assembly 800 can be L-shaped, which is best shown in FIGS. 12 and 13. The second end 806 selectively engages with the corner 198 of the main body 102. For example, when the clasp assembly 800 is in a position shown in FIG. 13, the second end 806 is engaging with the corner 198 of the main body 102. Since the clasp assembly 800 is located in the outer lid 104, the engagement of the second end 806 and the corner 198 locks the outer lid 104 and the main body 102 and, thus, prevents the outer lid 104 from being opened.

Figure 14:
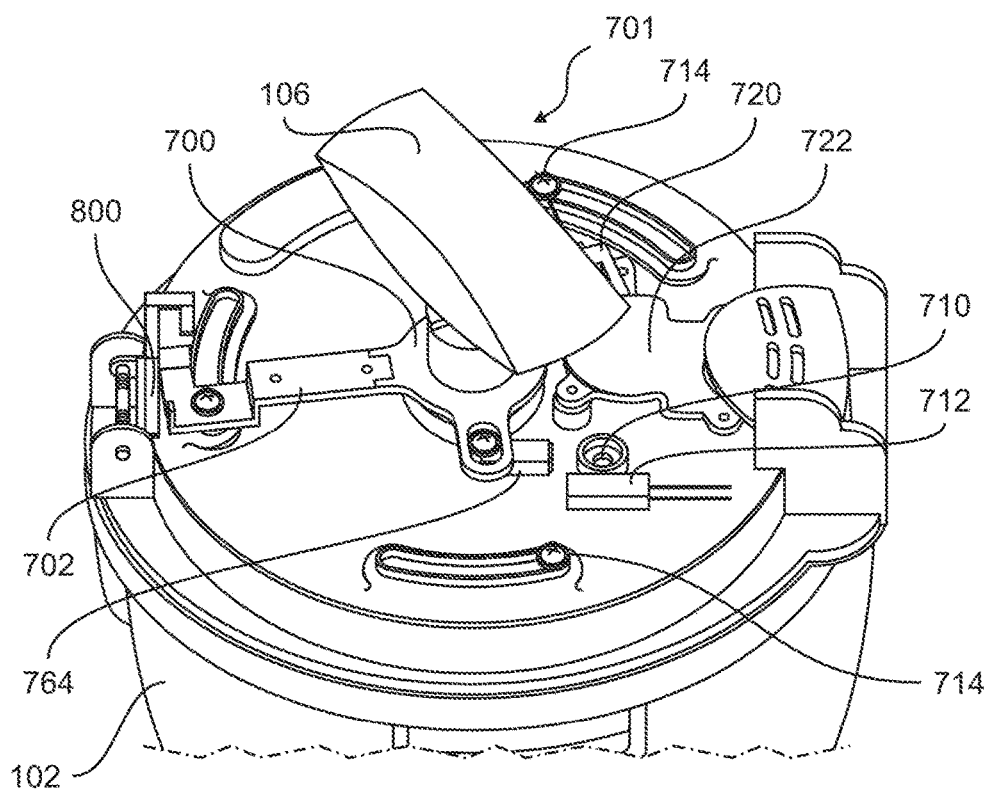
FIG. 14 is another internal view of the interior of the outer lid of a pressure cooker in accordance with an embodiment of the present invention with emphasis on the interaction between a actuator rod and a handle.

Referring to FIGS. 10, 12, and 14, the locking arm 702 on one end has a slope 756 (best shown in FIG. 12) and a hook 758 (best shown in FIG. 11). When a user turns the handle 106, actuator mechanism causes the slope 756 of the locking arm 702 to engage the first end 804 of the clasp assembly 800 there by causing the first end 804 to ride up the slope 756. When the first end 804 of the clasp assembly 800 reaches its final position along the slope 756, the clasp assembly moves from its naturally biased locked position to its unlocked position. As a result, as shown in FIG. 12, the second end 806 disengages with the corner 198 so that the user can open the outer lid 104 because the second end 806 no longer locks the outer lid 104 with the main body 102.

Figure 15:
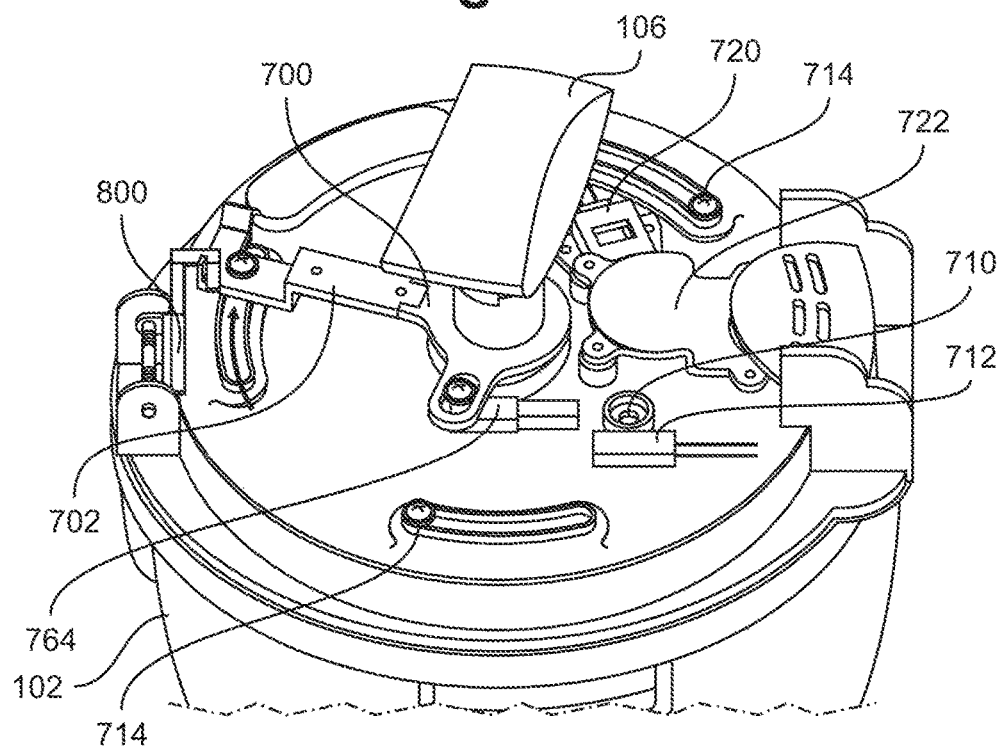
FIG. 15 is yet another internal view of the interior of the outer lid of a pressure cooker in accordance with an embodiment of the present invention with the actuator rod and the handle changed in position.
Figure 18:
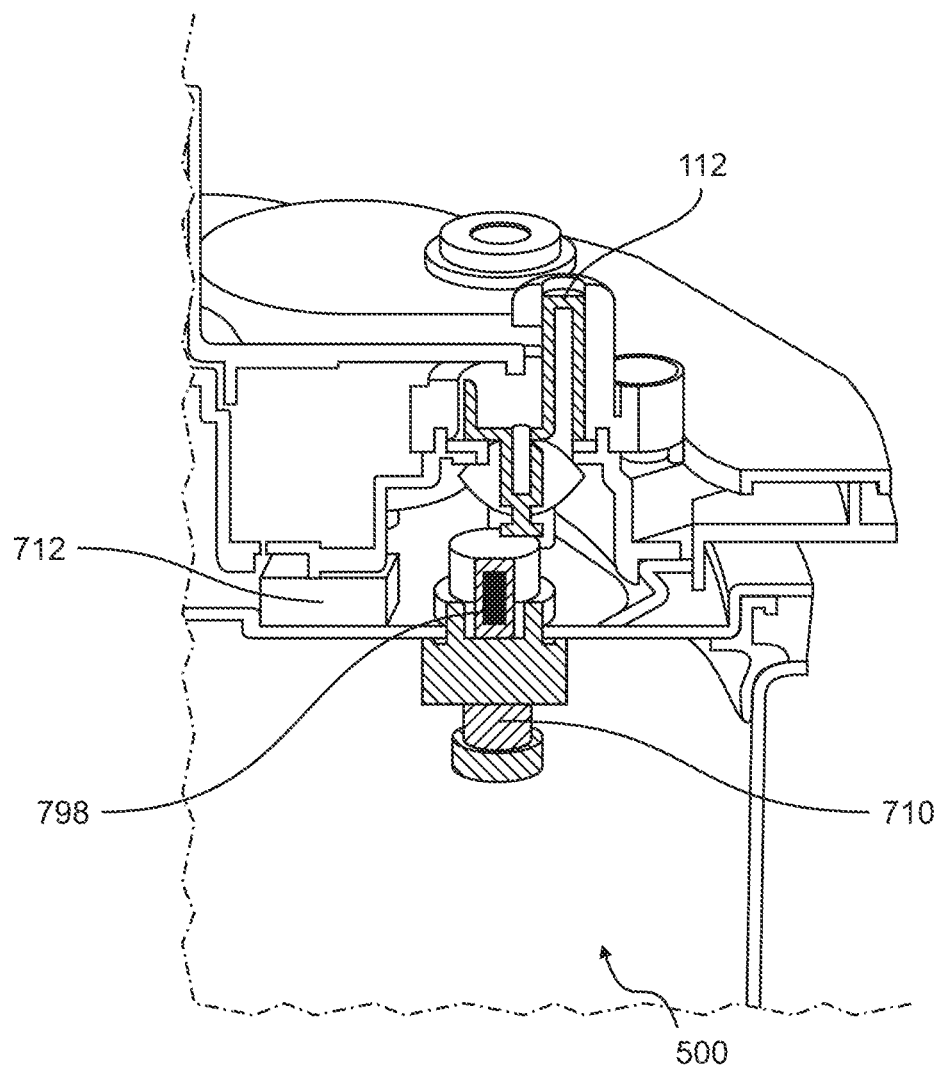
FIG. 18 is an internal view of the outer lid of a pressure cooker in accordance with an embodiment of the present invention showing a certain area where a pressure rod is located.

Now referring to FIGS. 11, 13, and 15, when users turn the handle 106 in an opposite direction, the first end 804 of the clasp assembly 800 rides back down the slope 756 (best shown in FIG. 13). Hence, the slope 756 is no longer engaging the clasp assembly 800. The clasp assembly 800 returns to its natural locked position due to the recoil force of the spring assembly 802. Now, the hook 758 of the locking arm 702 and the hook 852 of the clasp assembly 800 are fully engaged (best shown in FIG. 11) and the second end 806 of the clasp 800 and the corner 198 of the main body 102 are also fully engaged (best shown in FIG. 13). The engagement of the second end 806 of the clasp 800 and the corner 198 of the main body 102 locks the outer lid 104 and prevents the outer lid 104 from opening. Furthermore, the engagement of the hook 758 of the actuator rod 700 and the hook 852 of the clasp assembly 800 provides additional locking that prevents the clasp assembly 800 from further moving unless the handle 106 turns. This provides additional security so that the locking of the outer lid 104 does not solely depend on the recoil force provided by the spring assembly 802. This additional security arrangement allows users to hold the pressure cooker 100 with one hand at the region of the handle 106 without concern that the lock will not be strong enough and the outer lid 104 will accidentally break open.

In summary, FIGS. 10-15 show the interaction among the clasp assembly 800, the handle 106 and the locking arm 702. The clasp assembly 800 is configured to engage with the locking arm 702 based on the position of the locking arm 702. The clasp assembly 800 has at least an unlocked position, which is shown in FIGS. 10 and 12, and a locked position, which is shown in FIGS. 11 and 13. Since the clasp assembly 800 rests against the spring assembly 802, the recoil force of the spring assembly 802 naturally biases the clasp assembly 800 in its locked position unless the locking arm 702 provides a counter-force to resist the spring assembly 802 to move the clasp assembly 800 to its unlocked position.

Hence, if a user turns the handle 106 to the position shown in FIGS. 10, 12, and 14, the clasp assembly 800 is at its unlocked position and the outer lid 104 is unlocked, allowing the outer lid 104 to be opened from the main body 102. If users turn the handle 106 to the position shown in FIGS. 11, 13, 15, the clasp assembly 800 is at its locked position and the outer lid 104 is locked, thus preventing the outer lid 104 from opening.

FIGS. 14-17 show the interaction among the handle 106, the actuator rod 700, the locking arm 702, the rotatable rim 362, and the inner vessel 500. As discussed above, the actuator rod 700 is connected to the rim protrusions 360 via the primary attachment means 752 so that the rotation of the locking arm 702 controls the rotation of the rim 386 and the positions of rim protrusions 360.

The rim protrusions 360 are configured to selectively engage with the flanges 508 of the inner vessel 500. Referring to FIGS. 14 and 16, when users turn the handle 106 in one direction, the handle 106 turns the rim 362 via the locking arm 702. At this position, the rim protrusions 360 align with the recesses 510 and do not overlap with the flanges 508 of the inner vessel 500. Hence, the rim protrusions 360 are not engaging with the inner vessel 500. As such, the inner vessel 500 can be freely detached from the inner lid 310. It is noteworthy that the arrangement shown in FIG. 14 is also the arrangement when the clasp assembly 800 is at its unlocked position. Therefore, when the handle 106 is turned to the position shown in FIGS. 10, 12, 14, and 16, the outer lid 104 can be opened and, simultaneously, the inner vessel 500 is detached from the inner lid 310.

Referring to FIGS. 15 and 17, when users turn the handle 106 in the opposite direction, the handle 106 turns the rim 362 via the locking arm 702 to the position shown in FIG. 17. At this position, the flange 508 of the inner vessel 500 slides into the groove of the rim protrusions 500. This locks the inner vessel 500 with the inner lid 310. The inner vessel cannot be detached from the inner lid 310 when the rim protrusions 360 and the flanges 508 are engaged. Likewise, the arrangement shown in FIG. 15 is also the arrangement when the clasp assembly 800 is at its locked position. Therefore, when the handle 106 is turned to the position shown in FIGS. 11, 13, 15, and 17, the outer lid 104 is locked and, simultaneously, the inner vessel 500 is also locked with the inner lid 310. The locking between the inner vessel 500 and the inner lid 310 provides additional protection to prevent the outer lid 104 from being opened from the main body 102.

When the inner vessel 500 is locked with the inner lid 310, the inner vessel 500 is sealed. This allows pressure to be built up during cooking The locking mechanism of the handle 106 not only locks the outer lid 104 with the main body 102, but also seals the inner vessel 500 for cooking As such, these interactions among the handle 106, the actuator rod 700, the locking arm 702, the clasp assembly 800, the rim 362, the rim protrusions 360 and the flange 508 of the inner vessel 500 provides a locking mechanism that can be operated with one hand to simultaneously lock the outer lid 104 with the main body 102 and lock the inner lid 310 with the inner vessel 500.

Now referring to FIGS. 18, 19, 20 and 23, these figures illustrate a pressure indicator mechanism for the pressure cooker 100 in accordance with an embodiment of the present invention. The inner lid 310 is traversed by a pressure rod 710. The pressure rod 710 provides an indication of the level of pressure in the inner vessel 500. The pressure rod 710 is integrated with the inner lid 310 so the pressure rod 710 is able to traverse the inner lid 310 but not be removed from the inner lid 310. The pressure rod 710 can incorporate any conventional method for responding to pressure such as providing calibrated weight resistance or other calibrated biasing means to respond to respond to pressure within the inner vessel 500. The pressure rod 710 is configured so that it is pushed upward by pressure within the inner vessel during cooking In one embodiment shown in FIGS. 18-20, the pressure rod 710 is connected to a pressure indicator 112. The pressure indicator 112 protrudes outside of the outer lid 104 such that the pressure indicator 112 is visible to the users when the outer lid 104 is closed. When pressure is built up in the inner vessel 500, the pressure pushes the pressure rod 710 up. In turn, the pressure rod 710 pushes the pressure indicator 112 up. Since the pressure indicator 112 is visible, the rise of the pressure indicator 112 provides indication to the users that pressure has reached a certain level inside the inner vessel 500. How the change in pressure inside the receptacle 500 affects the positions of the pressure rod 710 and the pressure indicator 112 is illustrated by the differences between FIG. 19 and FIG. 20.

In an alternative embodiment, the pressure rod 710 and the pressure indicator is a single piece. A portion of the pressure rod 710 protrudes outside of the outer lid 104 such that a portion of the pressure rod 710 is visible to the users when the outer lid 104 is closed. The pressure indicator mechanism is essentially the same as the embodiments that contains separate pressure rod 710 and pressure indicator 112.

In some embodiments, the pressure rod 710 also comprises a first air-releasing opening 792 and a second air-releasing opening 794. Inside the pressure rod 710, there is an air-passage channel 796 that connects the first air-releasing opening 792 and the second air-releasing opening 794. The first air-releasing opening 792 is located above the upper surface 312 of the inner lid 310 and the second air-releasing opening 794 is located below the lower surface 314 of the inner lid 310. As such, air is free to go in or out of the inner vessel 500 unless at least one of the air-releasing openings is blocked by some means. In other words, when both of the air-releasing openings are open, pressure cannot build up within the inner vessel 500 because the inner vessel 500 is not completely sealed. In order to build up pressure in the inner vessel 500, one of the air-releasing openings must be closed or covered. For example, in FIG. 19, the first air-releasing 792 is covered by a circular wall 7106 thereby permitting pressure to rise when the pressure rod 710 is in this configuration.

Figure 20:
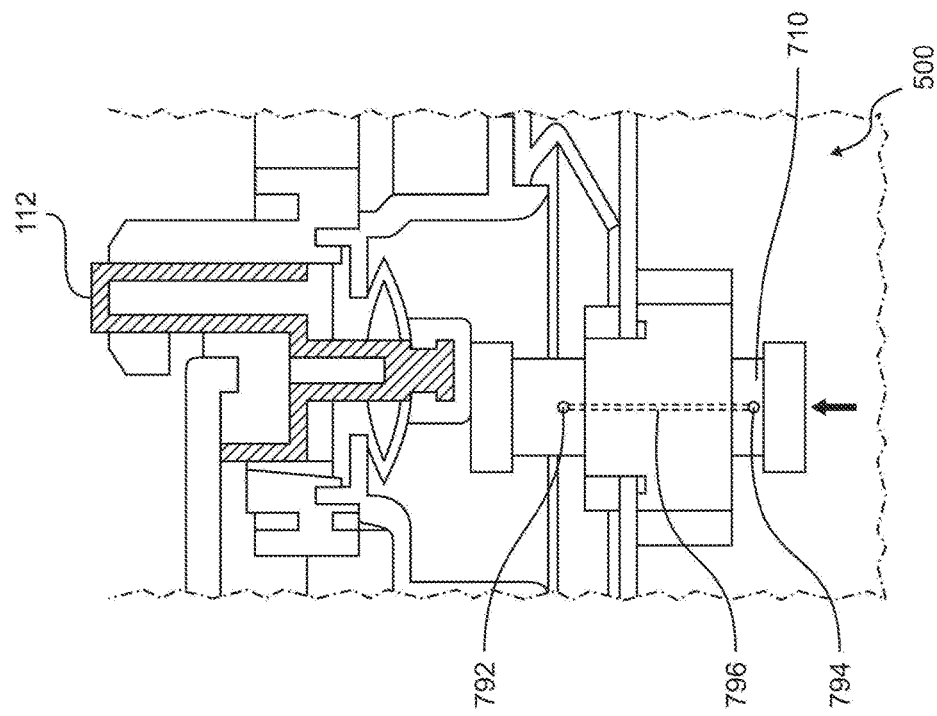
FIG. 20 is yet another internal view of the outer lid of a pressure cooker in accordance with an embodiment of the present invention with the emphasis on the pressure rod shown in FIG. 19 at a different level.
Figure 19:
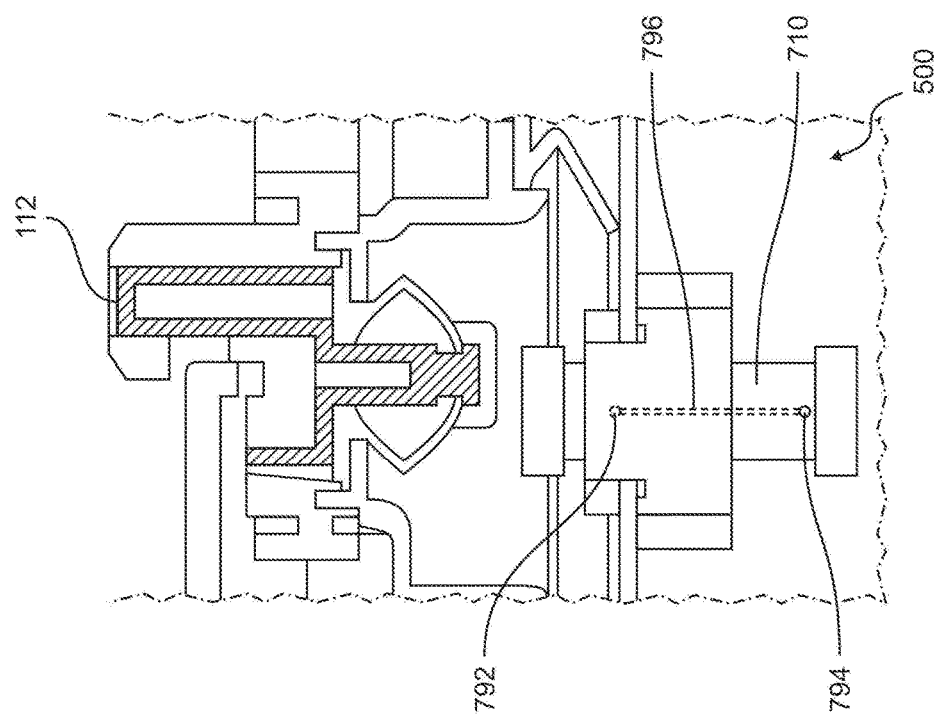
FIG. 19 is another internal view of the outer lid of a pressure cooker in accordance with an embodiment of the present invention with the emphasis on the level of a pressure rod.

FIGS. 8, 19, and 20 illustrate a safety feature that is related to the pressure rod 710 in accordance with an embodiment of the present invention. Referring to FIG. 8, the pressure rod 710 is located near the safety channel 764 and the member 762. The pressure rod 710 is configured to interact with the member 762. The pressure rod 710 traverses the inner lid 310 and it is configured to move to different levels. In one embodiment, the pressure rod 710 is capable of being at a first opened level or a second closed level. When the handle 106 is at its first opened position, for example, the position shown in FIG. 10, 12, or 14, the safety arm 704 is also at its first opened position. When the safety arm 704 is at its first opened position, the pressure rod 710 is configured such that the pressure rod 710 will remain at the first opened level such as the level shown in FIG. 20. At the first opened level, as shown in FIG. 20, both the first air-releasing opening 792 and the second air-releasing opening 794 are open. This prevents the pressure in the inner vessel from being built up.

When the handle 106 is at its second closed position, the position shown in FIGS. 11, 13, 15, the safety arm 704 is also at its second closed position. This allows pressure to build, which can result in the pressure rod 710 moving to the second level. At the second level, as shown in FIG. 19, the first air-releasing opening 792 is covered by the wall 7106. Hence, the air-passage channel between the first air-releasing opening 792 and the second air-releasing opening 794 is blocked. This allows the pressure in the inner vessel to rise. While in the embodiment shown in FIG. 19 it is the first air-releasing opening 792 that is blocked, those skilled in the art will understand that in other embodiments it could be the second air-releasing opening 794 that is blocked at the second level or even both air-releasing openings can be blocked at the second level. Those skilled in the art will also understand that the location of the first air-releasing opening 792 and the second air-releasing opening 794 are interchangeable.

The interaction between the pressure rod 710 and the safety arm 704 provides a safety mechanism to prevent the pressure cooker 100 from being opened when under pressure. When the safety arm 704 is at its first opened position, the outer lid 104 is not locked with the main body 102 and the inner vessel 500 is not locked with the inner lid 310. The pressure rod 710 remains at the first level when the actuator rod 700 is at the first opened position. The air-releasing openings of the pressure rod 710 prevent pressure from building up. This insures that the pressure cooker 100 cannot build up pressure even if the pressure cooker 100 is turned on if it is not fully locked. When the handle 106 is turned to the second closed position, the components of the pressure cooker 100 are locked. The pressure rod 710 is at the second level and the wall 7106 blocks the first air-releasing opening 792. In this configuration the pressure cooker 100 is ready to be used and pressure can be built up in the inner vessel 500.

Figure 21:
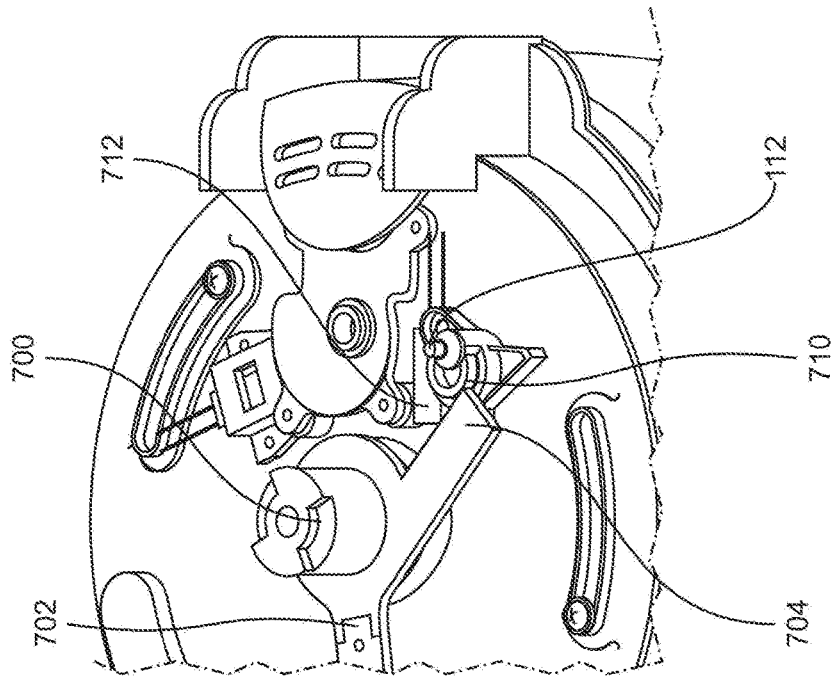
FIG. 21 is another internal view of the outer lid of a pressure cooker in accordance with an embodiment of the present invention with the emphasis on the interaction of a actuator rod and a pressure rod.
Figure 22:
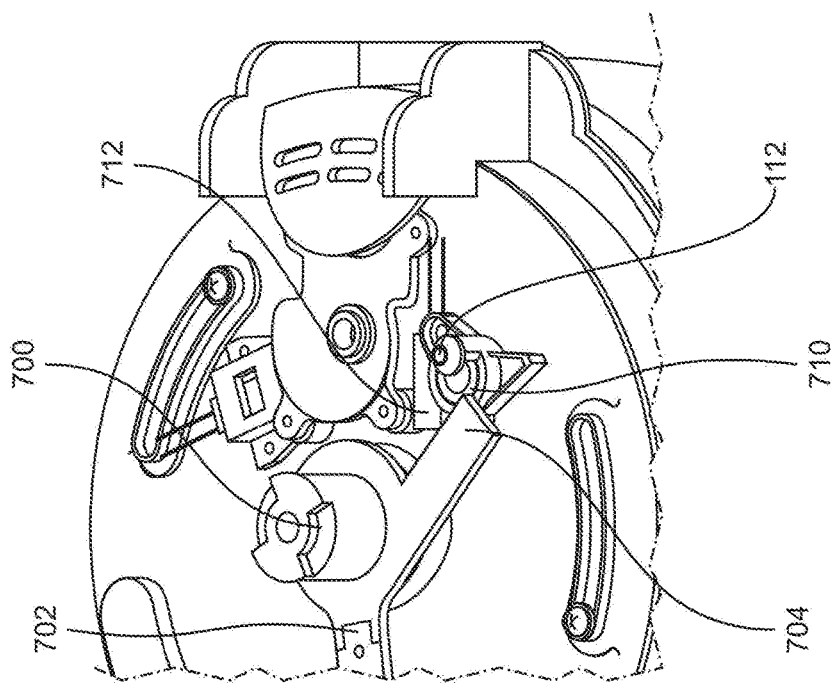
FIG. 22 is yet another internal view of the outer lid of a pressure cooker in accordance with an embodiment of the present invention with the emphasis on the interaction of a actuator rod and a pressure rod.

One safety concern of pressure-cooking is that users accidentally open the lid of a pressure cooker when the pressure cooker is under high pressure. This will create a rapid expansion of hot gas that could cause severe injury to the users and even explosion. FIGS. 21 and 22 illustrate an additional safety mechanism of the pressure cooker 100 in accordance with an embodiment of the present invention. As discussed, the pressure rod 710 is configured to move upward when the pressure of the inner vessel 500 builds up during cooking. In one embodiment, the pressure rod 710 is located in the rotating path of the safety arm 704.

In an alternative embodiment, the safety channel 764 is positioned right above the pressure rod 710, as shown in FIG. 10. When pressure is low, the level of the pressure rod 710 is below the rotating path, as shown in FIG. 21, or the safety channel 764, as shown in FIG. 10. Thus, the handle 106, the locking arm 702, and the safety arm 704 are all free to rotate between the first opened position and the second closed position. When the pressure in the inner vessel rises to a level that would make it unsafe to open, then the pressure rod 710 extends into the safety channel 764 thereby blocking the safety arm member 762 from moving.

Alternatively, the pressure rod 710 is configured such that it is pushed upward to a third level and a portion of the pressure rod 710 exceeds the upper surface 312 of the inner lid 310. Now a portion of the pressure rod 710 is in the middle of the rotating path of the safety channel 764. The pressure rod 710 blocks the path and prevents the safety arm 704 from turning to the first opened position. Since the safety arm 704 is secured to the actuator rod 700, this means that the actuator rod 700 cannot rotate, which effectively prevents the locking arm 702 from moving to the unlocked position because the locking arm 702 can only move in response to rotation of the actuator rod 700. As such, after cooking and when the pressure in the inner vessel 500 is at a certain high level of pressure, the lids of the pressure cooker 100 cannot be immediately opened because a portion of the pressure rod 710 is blocking the safety arm 704 from turning to the first opened position. The user must wait until the internal pressure returns to a safe level before the handle 106 can be turned to open the pressure cooker 100. This mechanism prevents the user from opening the pressure cooker when the pressure inside renders it is unsafe to open.

Referring back to FIG. 18, in one embodiment of the present invention the pressure rod 710 also comprises a component of magnetic material 7108 mounted on the pressure rod 710. Since the change in pressure of the inner vessel 500 changes the position of the pressure rod 710, the pressure rod 710 in turn carries the magnetic component 7108 to different positions. A reed switch 712 is located in the proximity of the pressure rod 710. The reed switch 712 is configured to control the electrical circuit of the pressure cooker 100 and is also configured to detect the location of the magnetic component 7108 based on the change of magnetic field due to the different locations of the magnetic component 7108. The reed switch 712 changes the electrical circuit based on the position of the magnetic component 7108. For example, the reed switch 712 can be configured such that, when the inner vessel 500 is in a high pressure and the pressure rod 710 is pushed up, the reed switch 712 provides an indication to the user interface 110 to visually signal the users that the pressure cooker 100 is in a high pressure. Also, if the pressure of the inner vessel 500 is at a dangerously high level, the reed switch 712 detects that the pressure rod 710 is pushed up to a very high level. The reed switch 712 can be configured such that at this stage the reed switch 712 will cut off the circuit of the pressure cooker 100 to prevent pressure to further build up.

Figure 24:
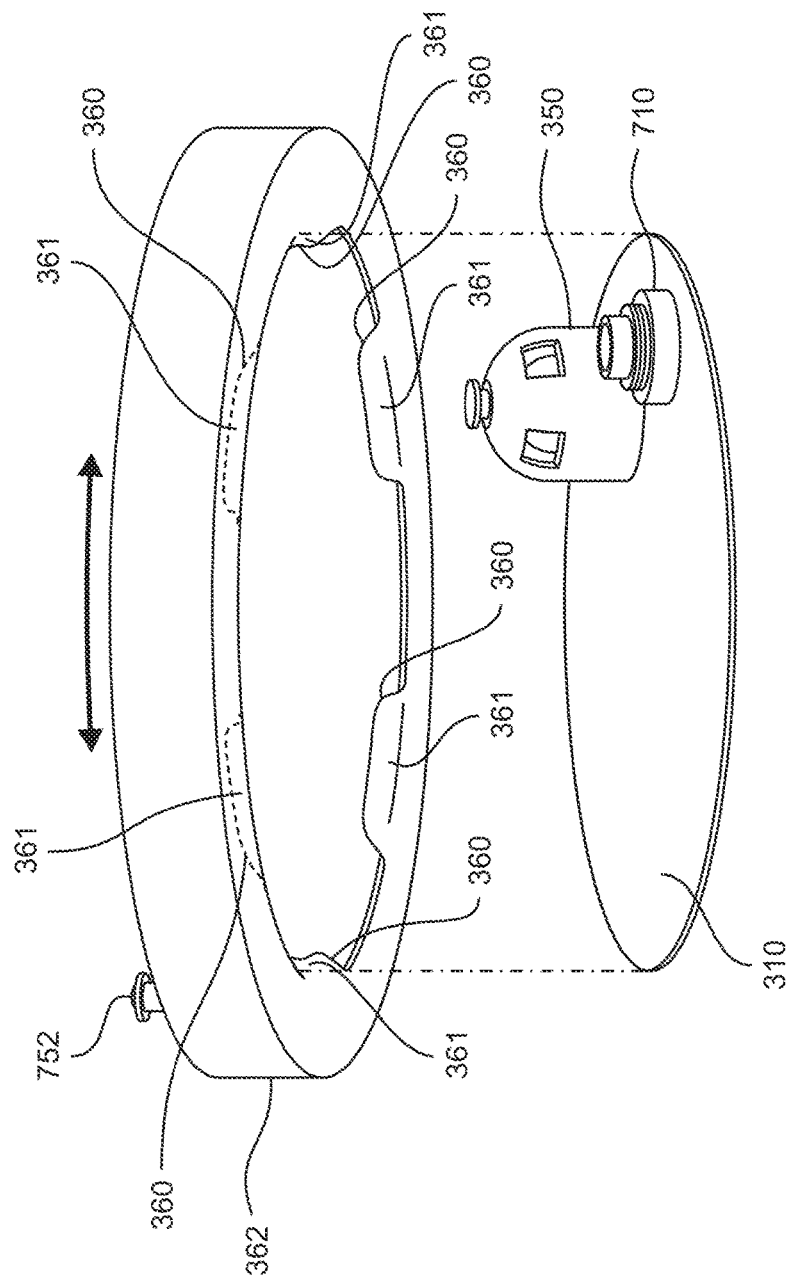
FIG. 24 is an isolated exploded view of the inner lid and the rim of a pressure cooker shown in FIG. 23 in accordance with an embodiment of the present invention.

FIG. 23 is an isolated view of the inner lid 310 together with the rim 362 in accordance with an embodiment of the present invention and FIG. 24 is an exploded view of the inner lid 310 and the rim 362. As shown in FIG. 24, the rim 362 is surrounding the inner lid 310 and the rim 362 is rotatably mounted about the inner lid 310. Both components are mounted on the outer lid 104 when installed. An air-releasing assembly 350 and a pressure rod 710 are located on the surface of the inner lid 310. The rim 362 is rotatable in relationship to the inner lid 310 and is secured to the locking arm 702 and outer lid 104 through attachment means 752 and 714 (best shown in FIGS. 7 and 8). When the inner lid 310 is installed in the pressure cooker 100, the rim 362 is rotatable and is controlled by the handle 106 via the locking arm 702 by the mechanism described in detail above. When the rim 362 rotates, the inner lid 310 remains stationary in the preferred embodiment.

Figure 25:
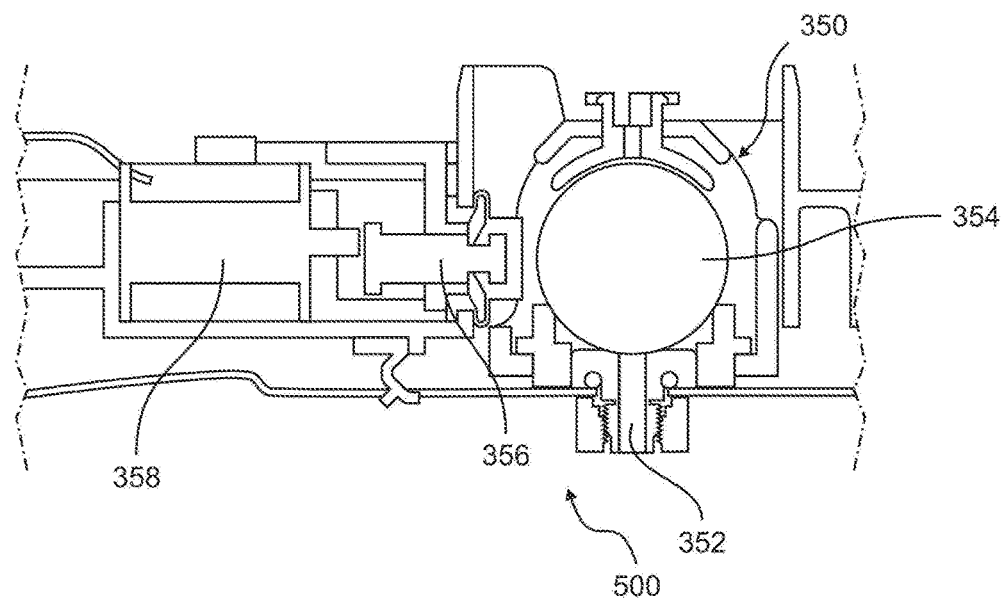
FIG. 25 is an illustrative view of an air-releasing assembly of a pressure cooker in accordance with an embodiment of the present invention.
Figure 26:
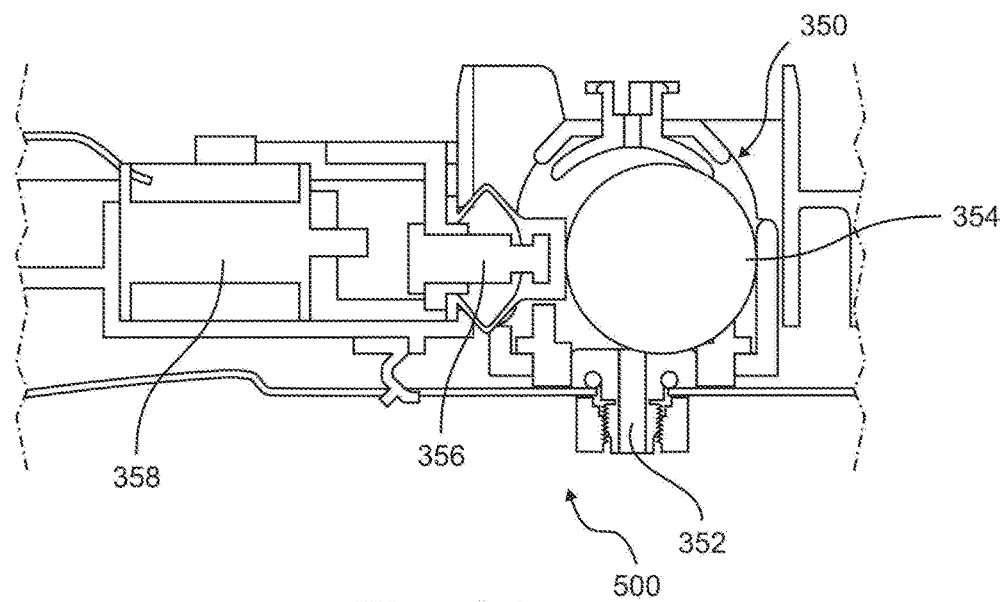
FIG. 26 is another illustrative view of an air-releasing assembly of a pressure cooker in accordance with an embodiment of the present invention.

Referring to FIG. 25, in accordance with an embodiment of the present invention, the pressure cooker 100 has two different ways to control or release pressure of the inner vessel 500. The first way is through the air-releasing openings 792 and 794 of the pressure rod 710 as discussed above. The second way is through an air-releasing assembly 350. In this embodiment, the pressure cooker further comprises an electromagnetic valve 358. The inner lid 310 has an air-releasing assembly 350 mounted on its upper surface. An air-releasing conduit 352 is present within the air-releasing assembly 350. The air-releasing conduit 352 traverses the inner lid 310 such that air can go in or out of the inner vessel 500 through the air-releasing conduit 352. A ball bearing 354 is movably mounted within the air-releasing assembly 352. The ball bearing 354 has a sealed position and a released position. The air-releasing conduit 352 cannot release pressure from the inner vessel 500 when the ball bearing 354 is at the sealed position, and can release pressure when the ball bearing 354 is at the released position. When the ball bearing is at the released position, it is configured to be pushed slightly away from the axis of the air-releasing conduit 352, thus opening the air-releasing conduit for air to be released from the inner vessel 500.

The electromagnetic valve 358 controls the position of the ball bearing 354 such that the electromagnetic valve 358 can control the pressure of the inner vessel. The electromagnetic valve 358 is coupled to a push rod 356. The electromagnetic valve 358 controls the position of the ball bearing 354 by applying a electromagnetic field to the push rod 356. For example, the default position of the ball bearing 354 is the sealed position. The users can control the release of pressure of the inner vessel 500 through the user interface 110. When the user interface 100 receives the command from the user, it directs the electromagnetic valve 358 to generate an appropriate magnetic field that causes the push rod 356 to push forward, pushing the ball bearing 354 away from the axis of the air-releasing conduit 352, thus allowing air to be released from the inner vessel 500.

In an embodiment of the present invention, the pressure cooker 100 is configured such as the release of pressure is automatic after cooking As discussed, after cooking, the inner vessel 500 is at a high pressure and the pressure rod 710 is pushed up, thus blocking the rotating path of the actuator rod 700 and preventing users from opening the lids. At this stage, the reed switch 712 provides an appropriate signal to the circuit and directs the electromagnetic valve 358 to cause the ball bearing 354 to move from the sealed position to the released position. In turn, air is slowly released from the inner vessel 500 and the pressure rod 710 is lowered. After the pressure rod 710 is lowered to a certain level, the reed switch 712 detects that the pressure rod 710 is low enough that it no longer blocks safety arm 704. The reed switch 712 then causes the user interface 110 to signal, such as by sound or light on the display of the user interface 100, to the user that the pressure has been lowered to a safe level for the user to open the pressure cooker 100. Then the user can turn the handle 106 to open the outer lid 104 after this automatic air-releasing mechanism.

Figure 27:
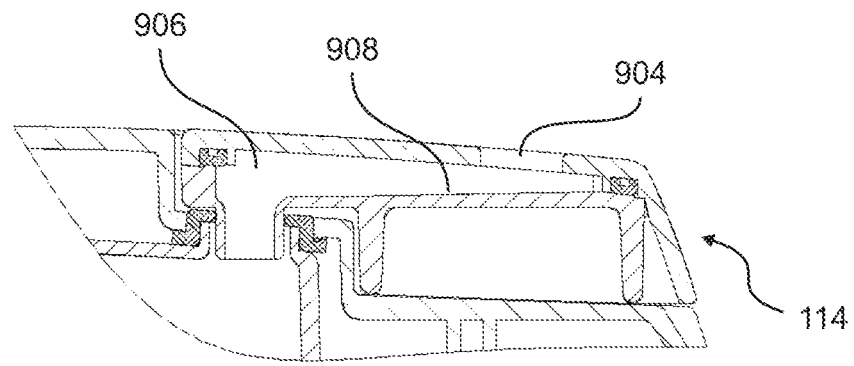
FIG. 27 is an illustrate side internal view a steam collecting assembly of a pressure cooker in accordance with an embodiment of the present invention.
Figure 28:
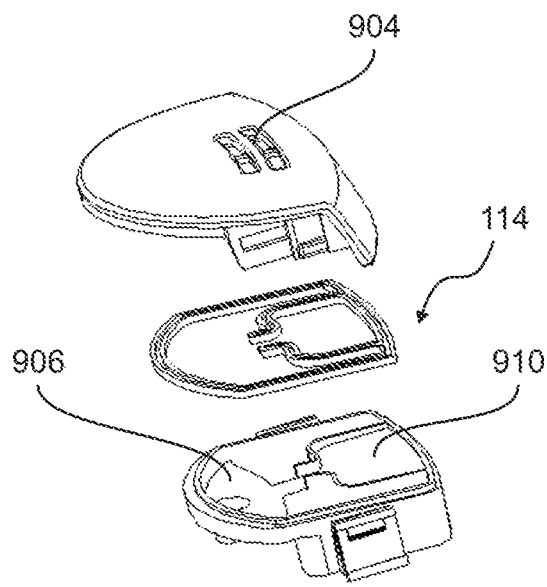
FIG. 28 is an illustrate exploded view of a team collecting assembly of a pressure cooker in accordance with an embodiment of the present invention.

Referring to FIGS. 27 and 28, the pressure cooker 100 has special structure for steam to be released from of the pressure cooker 100 and for condensed water to be collected together. The outer lid 104 comprises a steam valve 114 with external steam release openings 904 on the steam valve 114. The outer lid 104 also comprises a passage 906 which is connected to the external steam release openings 904 at a first end and configured to communicate with the air-releasing assembly 350. Hence, steam or air that is released from the air-releasing assembly 350 will exit the pressure cooker 100 via the passage 906 and the steam valve 114.

The passage 906 has a floor 908 that is sloped toward the air-releasing assembly 350 and the passage 906 is connected to a water storage cup 910. For any water that is condensed when the steam is passing through the passage 906, the water will go down along the slope of the passage 906 to be collected in the water storage cup 910. If excessive amount of water is generated, the slope of the passage 906 will make sure that the water will go back via the air-releasing assembly 350 to the inner lid 310. In this way the condensed water will only go to certain locations. This prevents water from going to other undesired location such on kitchen surface on which the pressure cooker 100 is operated. As such, the pressure cooker 100 is cleaner to use. The steam valve 114 and the water storage cups 910 are removable for cleaning purpose.

Now referring to FIG. 29, it is an internal view of the pressure cooker 100 in accordance with an embodiment of the present invention. Below the chamber 116, the pressure cooker 100 further comprises a heating assembly 180. The heating assembly 180 can be any type of heating component known in the art such as heating coil or magnetic heating component. At the upper middle region of the pressure cooker 100, there is a temperature measuring assembly 330 that measures the temperature inside the inner vessel 500.

The temperature measuring assembly 330 can be of any type known in the art such as a negative temperature coefficient type temperature component.

The pressure cooker 100 also comprises a user interface 110 and a main printed circuit board assembly 182, which allows users to electrically or digitally control the pressure cooker 100 via the user interface 110. The circuit board assembly 182 is configured to communicate with the electrical or electronic components of the pressure cooker 100, such as the temperature measuring assembly 330, the reed switch 712, the electromagnetic valve 358, the heating assembly 180, and the cooling fan assembly 184. As such, users can control the temperature and pressure of the pressure cooker 100 via the user interface 110 and obtain temperature and pressure information from the display of the user interface 110. For example, the users can control the release of pressure inside the inner vessel 500 by controlling the electromagnetic valve 358 to push the ball bearing 354 to the released position at any time. The user can also adjust the temperature of the pressure cooker through the user interface 110.

While in some embodiments discussed above the handle 106 is configured to be turned by the user manually, in other embodiments the handle 106 is connected to a motor that is controlled by the circuit board 182. As such, a user not only can turn the handle 106 to open or lock the lids, but also can use the user interface 110 to control the motor to turn the handle 106. As such, the opening and locking of the lids can be achieved automatically through the communication among the user interface 110, the circuit board 182 and the motor of the handle 106.

In some embodiments, the user interface 110 also has a wireless transceiver that is configured to utilize wireless technology such as Bluetooth or Wi-Fi to communicate remotely with users. As such, the user interface is capable of being controlled remotely to carry out any functions that are described above.

The foregoing description of the embodiments of the present invention has been presented for the purpose of illustration and description. It is not intended to be exhaustive or to limit the invention to the precise form disclosed. Many modifications and variations are possible in light of the above teachings. The numerical values described in the description are only for illustration purpose and should not be understood as limiting the invention to the precise numbers. It is intended that the scope of the present invention not be limited by this detailed description, but by the claims and the equivalents to the claims appended hereto.

I claim:

1. A cooker device, comprising:
a main body with a chamber therein;
a removable inner vessel configured to fit inside said chamber;
an outer lid pivotally mounted on said main body such that the outer lid can open and close relative to said main body;
an inner lid mounted to said outer lid, said inner lid configured to cover said inner vessel when said outer lid is closed with said main body;
a rotatable handle mounted on said outer lid, said handle rotates in a first direction to a locking position and rotates in a second direction to an unlocking position;
said handle connected to a first locking mechanism for locking said outer lid with said main body, wherein:
when said handle is in said locking position, said outer lid is locked wit said main body;
when said handle is in said unlocking position, said outer lid is unlocked from said main body;
said handle connected to a second locking mechanism for locking said inner lid with said inner vessel, wherein:
when said handle is in said locking position, said inner lid is locked with said inner vessel; and,
when said handle is in said unlocking position, said inner lid is unlocked from said inner vessel:
whereby, said handle locks and unlocks said first locking mechanism and said second locking mechanism simultaneously.

2. The cooking device of claim 1, said second locking mechanism comprising:
said inner vessel having a flange;
said outer lid having a rotatable rim with a protrusion configured to engage with said flange;
wherein, when said outer lid is closed onto said main body and said handle is rotated to said locking position, said rotatable rim rotates such that said protrusion slides under said flange such that said inner lid is locked with said inner vessel.

3. The cooking device of claim 1, said second locking mechanism comprising:
said inner vessel having at least two flanges with a recess therein between;
said outer lid having a rotatable rim with a protrusion configured to engage with one of said flanges:
wherein, when said outer lid is closed onto said main body and said handle is in said unlocking position, said protrusion is aligned with said recess, and when said handle is rotated to said locking position, said rotatable rim rotates such that said protrusion slides into alignment with said flange such that engagement between said protrusion and said flange locks said inner lid with said inner vessel.

4. The cooking device of claim 3, further comprising:
said handle connected to a locking arm that rotates when said handle is rotated, said handle is connected to said rotatable rim of said outer lid;
wherein, when said handle is rotated to said locking position, said locking arm rotates to move said rotatable rim such that said protrusion moves into alignment with said flange of said inner vessel, thus locking said inner lid with said inner vessel.

5. The cooking device of claim 3, further comprising:
said handle connected to a locking arm that rotates when said handle is rotated;
wherein, when said handle is rotated to said unlocking position, said locking arm moves said rotatable rim such that said protrusion moves into alignment with said recess of said inner vessel, thus allowing said inner lid to be detached from said inner vessel.

6. The cooking device of claim 1, said first locking mechanism further comprising:
a clasp assembly mounted in said outer lid, said clasp assemble removable engages with the main body to lock the outer lid;
said handle connected to a locking arm that rotates when said handle is rotated;
wherein, when said handle is rotated to said locking position, said locking arm is engaged with said clap assembly to lock said outer lid with said main body.

7. The cooking device of claim 1, further comprising:
an electromagnetic valve;
an air-releasing assembly mounted on the inner lid;
an air-releasing conduit with the air-releasing assembly; the air-releasing conduit traversing the inner lid such that air can go in or out of the inner vessel through the air-releasing conduit;
a ball bearing that is movable mounted within the air-releasing assembly; the ball bearing having a sealed position and a released position; wherein the ball bearing is configured to seal the air-releasing conduit when the ball bearing is at the sealed position, and wherein the ball bearing is configured to open the air-releasing conduit for air to be released from the inner vessel when the ball bearing is at the released position;
wherein the ball bearing and the electromagnetic valve are configured such that the ball bearing's position is controlled by the electromagnetic valve.

8. The cooking device of claim 7, wherein the electrical circuit is controlled by a user interface such that the user interface can control the ball bearing's position to release air from the inner vessel.

9. The cooking device of claim 8, wherein the user interface is capable of being controlled remotely.

10. The cooking device of claim 7, wherein the outer lid further comprises an external steam releasing opening on an upper surface of the outer lid and further comprises a passage which is connected to the external steam releasing opening at a first end and configured to communicate with the air-releasing assembly at a second end.

11. The cooking device of claim 10, wherein the passage has a floor that is sloped toward the air-releasing assembly and the passage is connected to a water storage cup.

12. The cooking device of claim 1 further comprising a temperature measuring assembly mounted on the inner lid.

* * * * *